(12) United States Patent
Jeon et al.

(10) Patent No.: US 9,343,762 B2
(45) Date of Patent: May 17, 2016

(54) CONTROLLER FOR ESTIMATING RELATIVE HUMIDITY AND CONDENSED WATER, AND METHOD FOR CONTROLLING CONDENSED WATER DRAIN USING THE SAME

(75) Inventors: Soon Il Jeon, Gyeonggi-do (KR); Dae Jong Kim, Gyeonggi-do (KR); Dong Hun Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 588 days.

(21) Appl. No.: 13/153,823

(22) Filed: Jun. 6, 2011

(65) Prior Publication Data
US 2012/0148927 A1    Jun. 14, 2012

(30) Foreign Application Priority Data
Dec. 9, 2010    (KR) .................... 10-2010-0125324

(51) Int. Cl.
*H01M 8/04*    (2006.01)

(52) U.S. Cl.
CPC ........ *H01M 8/04992* (2013.01); *H01M 8/0438* (2013.01); *H01M 8/0485* (2013.01); *H01M 8/04156* (2013.01); *H01M 8/04358* (2013.01); *H01M 8/04395* (2013.01); *H01M 8/04492* (2013.01); *H01M 8/04828* (2013.01); *H01M 8/04835* (2013.01); *H01M 8/04843* (2013.01); *Y02E 60/50* (2013.01)

(58) Field of Classification Search
None
See application file for complete search history.

(56) References Cited

U.S. PATENT DOCUMENTS

| 2005/0077364 | A1 | 4/2005 | Hwang |
| 2006/0115700 | A1* | 6/2006 | Kotani et al. .................... 429/25 |
| 2006/0263653 | A1 | 11/2006 | Sinha et al. |
| 2007/0141412 | A1* | 6/2007 | Becker .............. H01M 8/04141 429/414 |
| 2008/0152977 | A1* | 6/2008 | Kusano et al. .................. 429/26 |
| 2009/0280360 | A1* | 11/2009 | Weingaertner et al. ......... 429/13 |
| 2011/0113857 | A1* | 5/2011 | Sinha ................ H01M 8/04358 73/29.02 |

FOREIGN PATENT DOCUMENTS

| CN | 1606187 A | 4/2005 |
| CN | 100346517 C | 10/2007 |
| JP | 2002164065 A | 6/2002 |
| JP | 2003036875 A | 2/2003 |
| JP | 2004-119052 A | 4/2004 |
| JP | 2004192973 A | 7/2004 |
| JP | 2009004151 A | 1/2009 |

* cited by examiner

*Primary Examiner* — Jonathan Crepeau
(74) *Attorney, Agent, or Firm* — Mintz Levin Cohn Ferris Glovsky and Popeo, P.C.; Peter F. Corless

(57) ABSTRACT

The present invention provides a relative humidity and condensed water estimator for a fuel cell and a method for controlling condensed water drain using the same. Here, the relative humidity and condensed water estimator is utilized in control of the fuel cell system involving control of anode condensed water drain by outputting at least two of signals comprising air-side relative humidity, hydrogen-side relative humidity, air-side instantaneous or cumulative condensed water, hydrogen-side instantaneous or cumulative condensed water, instantaneous and cumulative condensed water of the humidifier, membrane water contents, catalyst layer oxygen partial pressure, catalyst layer hydrogen partial pressure, stack or cell voltage, air-side catalyst layer relative humidity, hydrogen-side catalyst layer relative humidity, oxygen supercharging ratio, hydrogen supercharging ratio, residual water in a stack, and residual water in a humidifier.

2 Claims, 18 Drawing Sheets

CONTROLLER FOR ESTIMATING RELATIVE HUMIDITY AND CONDENSED WATER, AND METHOD FOR CONTROLLING CONDENSED WATER DRAIN USING THE SAME

CROSS-REFERENCE TO RELATED APPLICATION

This application claims under 35 U.S.C. §119(a) the benefit of Korean Patent Application No. 10-2010-0125324 filed Dec. 9, 2010, the entire contents of which are incorporated herein by reference.

BACKGROUND (a) Technical Field

The present invention relates to a relative humidity and condensed water estimator for a fuel cell, and a method for controlling condensed water drain using the same. More particularly, it relates to an estimator for dynamically estimating relative humidity and condensed water in a fuel cell system, and a method for controlling condensed water drain in an anode of a fuel cell stack using the same.

(b) Background Art

Theoretically, a fuel cell system is a simple system that receives hydrogen and air from the outside to generate electricity and water in a stack. In reality, however, water that is a by-product of electrochemical reactions is changed into a combination of water vapor, saturated liquid, and ice according to the real-time operation conditions such as temperature and pressure. Since these phase changes affect the transfer characteristics of water, and also the transfer characteristics of gases and electrons passing through a gas diffusion layer, a catalyst layer, a membrane, and a separator channel of a stack, it is hard to estimate internal phenomena of the fuel cell system.

Particularly, since the fuel cell system is a system having high non-linearity in which the performance of a stack changes due to coexistence of, so-called, flooding and dry-out phenomena that signify overflow and deficiency of water, respectively, it is more difficult to estimate the internal phenomena of the fuel cell system.

For this reason, a sensor for measuring the relative humidity in the fuel cell system and a condensed water level sensor for sensing the level of condensed water are installed to manage water in the stack. However, when the relative humidity sensor is used, the cost of materials increases. Also, since the relative humidity sensor and the condensed water level sensor easily break down due to frequent contact with water, the maintenance costs may increase, and the reliability may be reduced in terms of control.

Accordingly, there is a need for the development of a technique for determining the relative humidity and the state of condensed water to manage water in a fuel cell system so as to overcome the above limitations.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an estimator for dynamically estimating relative humidity (RH) and condensed water in a fuel cell system, and a method for controlling condensed water drain in an anode using the same, in order to overcome the flooding phenomenon that signifies overflow of water, and the dry-out phenomenon that signifies deficiency of water, which are caused by changes of the amount and the state of transferred water according to changes of operation conditions such as operation temperature and pressure of a fuel cell.

In one aspect, the present invention provides a relative humidity and condensed water estimator for a fuel cell, including controllers for dynamically estimating relative humidity and condensed water in a fuel cell system using fluid dynamics and a mass balance equation of oxygen, nitrogen, hydrogen, and water, wherein the relative, humidity and condensed water estimator is utilized in control of the fuel cell system involving control of anode condensed water drain by outputting at least two of signals including: (1) air-side relative humidity; (2) hydrogen-side relative humidity; (3) air-side instantaneous or cumulative condensed water; (4) hydrogen-side instantaneous or cumulative condensed water; (5) instantaneous and cumulative condensed water of the humidifier; (6) membrane water contents; (7) catalyst layer oxygen partial pressure; (8) catalyst layer hydrogen partial pressure; (9) stack or cell voltage; (10) air-side catalyst layer relative humidity; (11) hydrogen-side catalyst layer relative humidity; (12) oxygen supercharging ratio; (13) hydrogen supercharging ratio; (14) residual water in a stack; and (15) residual water in a humidifier.

In one embodiment, the controllers may be mounted in the estimator, and may include an air blower controller that calculates inflow and relative humidity and a humidifier controller, The humidifier controller includes a tube control unit that calculates the tube outflow of the humidifier and then calculates air and water balance through proportional-integral (PI) control for estimating a target pressure (P1). The humidifier controller can also include a shell control unit that calculates the shell outflow of the humidifier and then calculates air and water balance through PI control for estimating a target pressure (P2).

Additionally, the estimator may also have a stack controller therein that includes a cathode gas channel (CGC) control unit which calculates the outflow of a cathode gas channel of the stack through PI control for estimating a target pressure (P3), and then calculates the air and water balance. In addition to the CGC control unit, the stack controller may also have a cathode gas diffusion layer (CGDL) control unit, a cathode catalyst layer (CCL) control unit, a membrane layer (MEM) control unit, an anode catalyst layer (ACL) control unit and an anode gas channel (AGC) control unit. The CGDL control unit calculates the movement of air and water by diffusion and capillary phenomena of a gas diffusion layer by calculating the concentration of air and water. The CCL control unit calculates generated water a voltage (parameter: current, temperature, oxygen partial pressure, and hydrogen partial pressure) and residual water through an electrochemical reaction. The MEM control unit calculates the water concentration of a membrane by osmotic drag, back diffusion, and heat pipe, and calculates the amount of water moved to the cathode and anode catalyst layers. Finally, the ACL control unit calculates the residual water of the anode catalyst layer, the AGDL control unit calculates the movement of air and water by diffusion and capillary phenomena of the gas diffusion layer by calculating the concentration of hydrogen and water, and the AGC control unit calculates the outflow of an anode gas channel of the stack through PI control for estimating a target pressure (P5), and then calculates the air and water balance.

The estimator may also include a fuel processing system (FPS) controller 40 which has a hydrogen supply control unit 42 for calculating a hydrogen inflow through PI control for estimating a target pressure P4, a hydrogen inlet manifold control unit 44 for controlling a mixture ratio between supplied hydrogen and recycled hydrogen, a hydrogen outlet manifold control unit 46 for performing hydrogen purging and condensed water drain control, and a hydrogen recycle loop control unit 48 for controlling an ejector and a recycle blower.

In another aspect, the present invention also provides a method for controlling condensed water drain using a relative humidity and condensed water estimator for a fuel cell. This method starts by calculating a residual amount of condensed water based on a water balance equation in an anode condensed water collector ant then determining, as a warning stage of a condensed water level sensor, if the residual amount of condensed water is greater than a product of a density ($\rho$[kg/m^3]) of condensed water and a total volume (V1[^3]) of the condensed water collector, and a duration thereof is greater than the reference value t1. Then the system determines that a condensed water level sensor has failed if V_cell is smaller than V_cell_TH, $\Delta$V_cell is greater than $\Delta$V_cell_TH, a hydrogen recycle blower RPM is smaller than RPM_cmd_RPM_TH, an anode stack inlet pressure is greater than inlet normal pressure map plus P_TH, or an anode stack outlet pressure is greater than outlet normal pressure map plus P_TH, and a duration thereof is greater than a reference value t2. In response, the condensed water drain valve is controlled based on an anode water trap (AWT) estimated value.

In still another aspect, the present invention provides a method for controlling condensed water drain using a relative humidity and condensed water estimator for a fuel cell. More specifically, a residual amount of condensed water is calculated based on a water balance equation in an anode condensed water collector and a condensed water level sensor is determined to be in a warning stage if the residual amount of condensed water is equal to or smaller than about 0, and a duration thereof is greater than a reference value (t5). The condensed water level sensor is determined to have failed if a calculated hydrogen utilization rate is smaller than a value obtained by subtracting a hydrogen utilization rate acceptable reference value from a normal hydrogen utilization rate map, or a hydrogen leakage sensor is on, and the duration is greater than a reference value (t6). In response to these determinations, a condensed water drain valve is controlled based on an anode water trap (AWT) estimated value.

In a further aspect, the present invention provides a method for controlling condensed water drain using a relative humidity and condensed water estimator for a fuel cell. In this method, a cumulative amount of condensed water, a cumulative amount of generated water, and a cumulative condensed water estimated value are calculated based on an operation of a drain valve in an anode condensed water collector. A condensed water level sensor is determined to be in a warning stage if a cumulative condensed water ratio (AW_ratio1) is smaller than a value obtained by subtracting a cumulative condensed water ratio difference acceptable reference value (AWT_TH) from a cumulative condensed water ratio (AWT_ratio2), and a duration thereof is greater than a reference value (t1). However, the condensed water level sensor is determined to have failed if V_cell is smaller than V_cell_TH, $\Delta$V_cell is greater than $\Delta$V_cell_TH, hydrogen recycle blower RPM is smaller than RPM_cmd_RPM_TH, anode stack inlet pressure is greater than inlet normal pressure map plus P_TH, or anode stack outlet pressure is greater than outlet normal pressure map plus P_TH, and a duration there is greater than a reference value (t2). In response to these determinations, a condensed water drain valve is controlled based on an anode water trap (AWT) estimated value.

In a still further aspect, the present invention provides a method for controlling condensed water drain using a relative humidity and condensed water estimator for a fuel cell. In this method, a cumulative amount of condensed water, a cumulative amount of generated water, and a cumulative condensed water estimated value are calculated based on an operation of a drain valve in an anode condensed water collector. A condensed water level sensor is then determined to be in a warning stage if a cumulative condensed water ratio (AWT_ratio1) is greater than a value obtained by adding a cumulative condensed water ratio difference acceptable reference value (AWT_TH) to a cumulative condensed water ratio (AWT_ratio2), and a duration thereof is greater than a reference value (t5). However, the condensed water level sensor is determined to have failed if a calculated hydrogen utilization rate is smaller than a value obtained by subtracting a hydrogen utilization rate acceptable reference value H2_Util_TH from a normal hydrogen utilization rate map, or a hydrogen leakage sensor is on, and a duration thereof is greater than a reference value (t6). In response to these determinations, a condensed water drain valve is controlled based on an anode water trap (AWT) estimated value.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
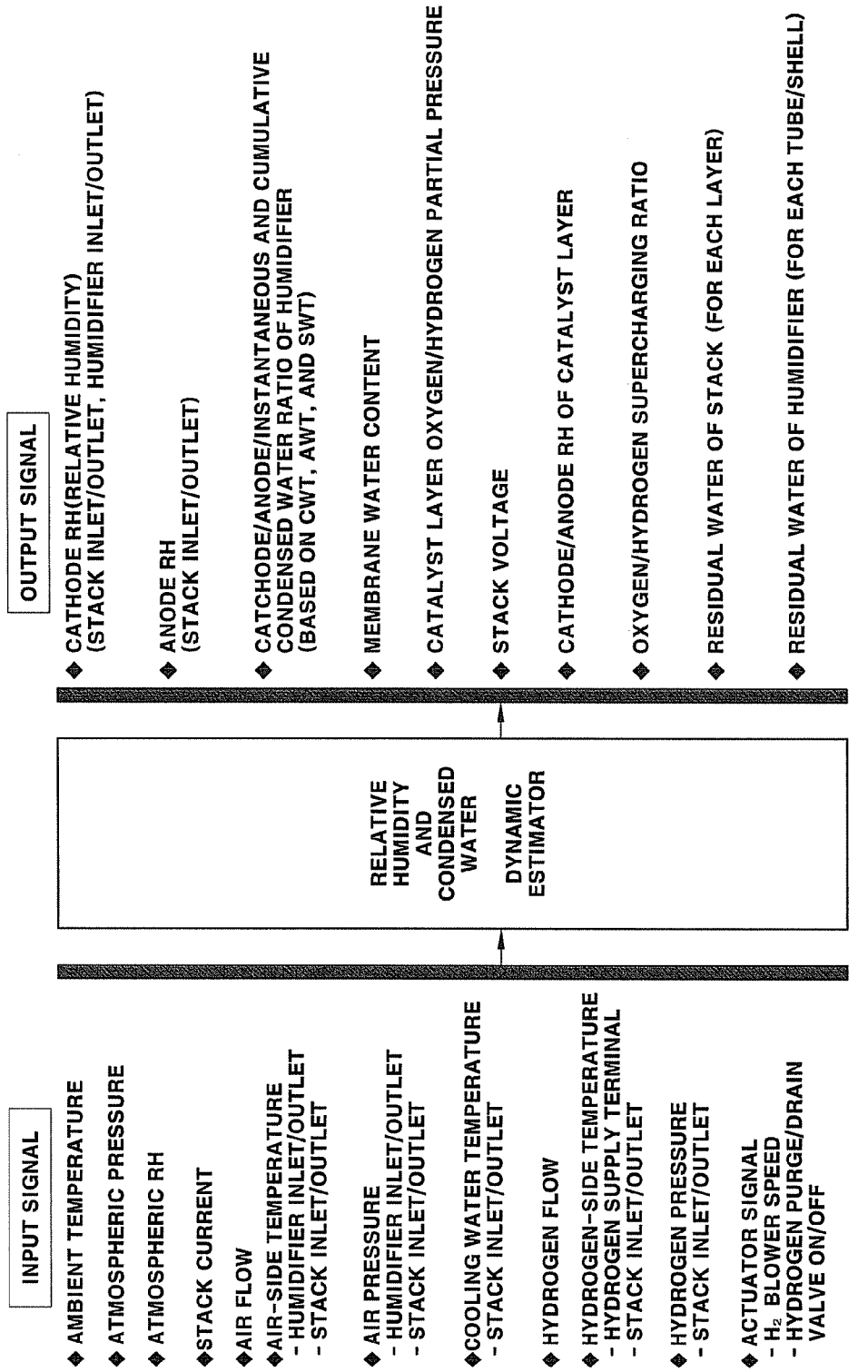
FIG. 1 is a block diagram illustrating representative input and output signals of a relative humidity and condensed water estimator for a fuel cell according to an exemplary embodiment of the preset invention.

Reference numerals set forth in the Drawings includes reference to the following elements as further discussed below:
- 10: relative humidity and condensed water estimator
- 20: internal estimator air blower controller
- 30: internal estimator humidifier controller
- 40: internal estimator fuel processing system (FPS) controller
- 50: internal estimator stack controller It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings.

The present invention relates to an estimator for dynamically estimating relative humidity and condensed water of a fuel cell system, and a method for controlling condensed water drain existing in an anode using the estimator.

The estimator for estimating relative humidity and condensed water of the fuel cell system is a kind of a controller that dynamically estimates the relative humidity and the condensed water in the fuel cell system, based on temperature/flow rate/pressure sensor signals of air/hydrogen/cooling water for the purpose of overall control of the fuel cell system. The output signal of the estimator may include air-side/hydrogen-side relative humidity, air-side/hydrogen-side/humidifier instantaneous and cumulative condensed water ratio, membrane water content, catalyst layer oxygen/hydrogen partial pressure, stack voltage, air-side/hydrogen-side catalyst layer relative humidity, oxygen/hydrogen supercharging ratio, residual water in a stack, and residual water in a humidifier.

As shown in FIG. 1, the relative humidity and condensed water estimator according to an embodiment of the present invention may receive input signals including ambient temperature, atmospheric pressure, atmospheric relative humidity (RH), stack current, flow rate of air supplied to a cathode of a stack, air temperature at the inlet/outlet of the humidifier and the inlet/outlet of the stack, air pressure at the inlet/outlet of the humidifier and the inlet/outlet of the stack, cooling water temperature at the inlet/output of the stack, flow rate of hydrogen supplied to the anode of the stack, hydrogen temperature at the hydrogen supply line and the inlet/outlet of the stack, hydrogen pressure at the inlet/outlet of the stack, and an actuator signal including hydrogen blower speed and on/off state of hydrogen purge/drain valve.

The relative humidity and condensed water estimator may output signals including cathode relative humidity (RH) at the inlet/outlet of the stack and the inlet/outlet of the humidifier, anode relative humidity (RH) at the inlet/outlet of the stack, instantaneous and cumulative condensed water ratio of cathode/anode/humidifier (based on CWT, AWT, and SWT), membrane water content, oxygen/hydrogen partial pressure of cathode and anode catalyst layers, stack voltage, relative humidity of the cathode/anode catalyst layer, oxygen/hydrogen supercharging ratio, residual water of the stack (for each layer), and residual water of the humidifier (for each tube/shell).

The relative humidity and condensed water estimator may output at least two of signals including: (1) air-side relative humidity; (2) hydrogen-side relative humidity; (3) air-side instantaneous or cumulative condensed water; (4) hydrogen-side instantaneous or cumulative condensed water; (5) instantaneous and cumulative condensed water of the humidifier; (6) membrane water contents; (7) catalyst layer oxygen partial pressure; (8) catalyst layer hydrogen partial pressure; (9) stack or cell voltage; (10) air-side catalyst layer relative humidity; (11) hydrogen-side catalyst layer relative humidity; (12) oxygen supercharging ratio; (13) hydrogen supercharging ratio; (14) residual water in the stack; and (15) residual water in the humidifier, in order to dynamically estimate the relative humidity and the condensed water in the fuel cell system using the fluid dynamics and mass balance equation of oxygen, nitrogen, hydrogen, and water.

For reference, portions indicated as ovals in each drawing represent output signals of the relative humidity and condensed water estimator.

Figure 2:
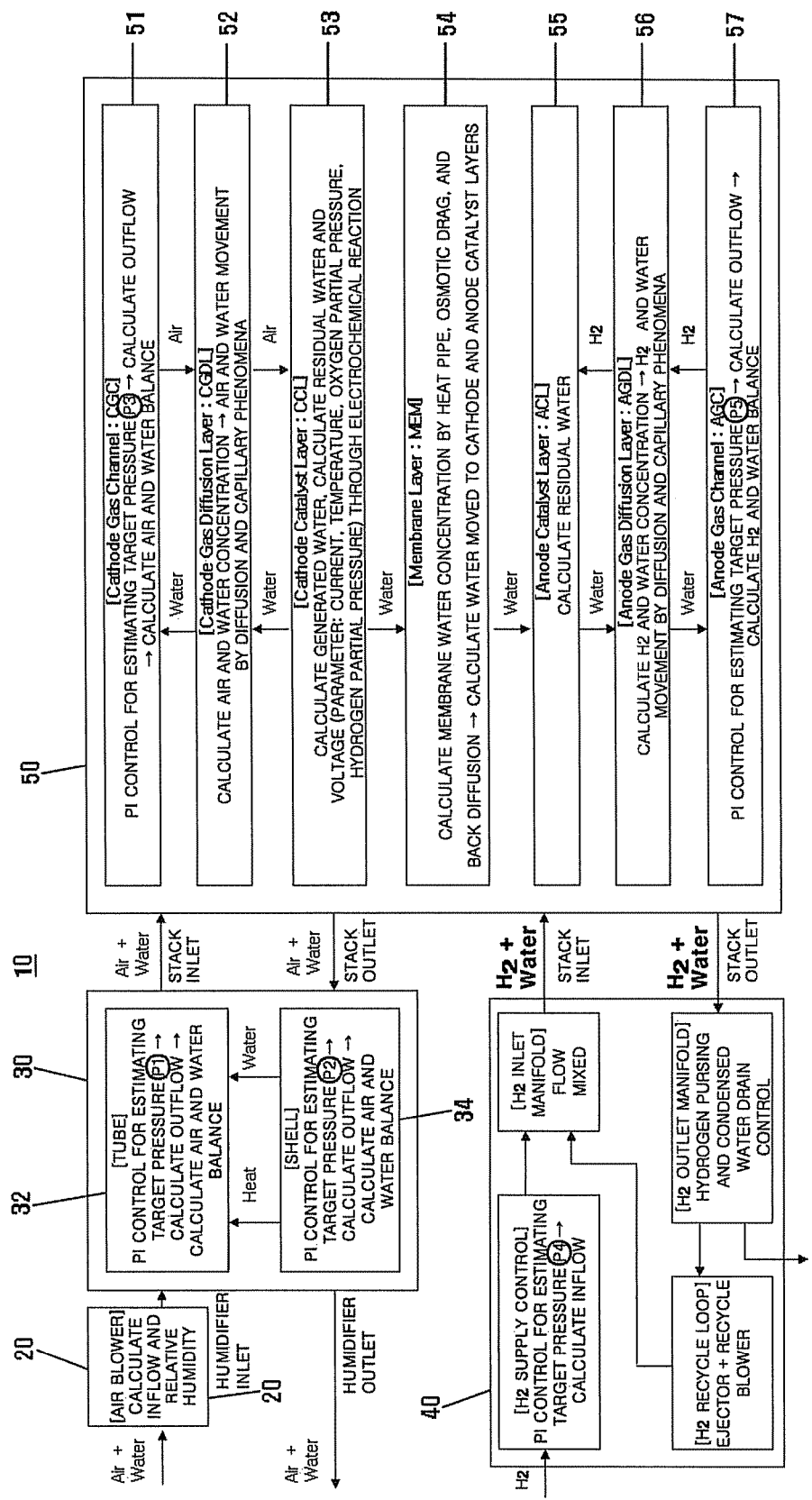
FIG. 2 is a diagram illustrating a relative humidity and condensed water estimator for a fuel cell according to an exemplary embodiment of the present invention.

As shown in FIG. 2, the estimator 10 that receives and outputs signals as described above illustratively includes an internal estimator air blower controller 20, an internal estimator humidifier controller 30 including a tube control unit 32 and a shell control unit 34, an internal estimator fuel processing system (FPS) controller 40, and an internal estimator stack controller 50.

Figure 3:
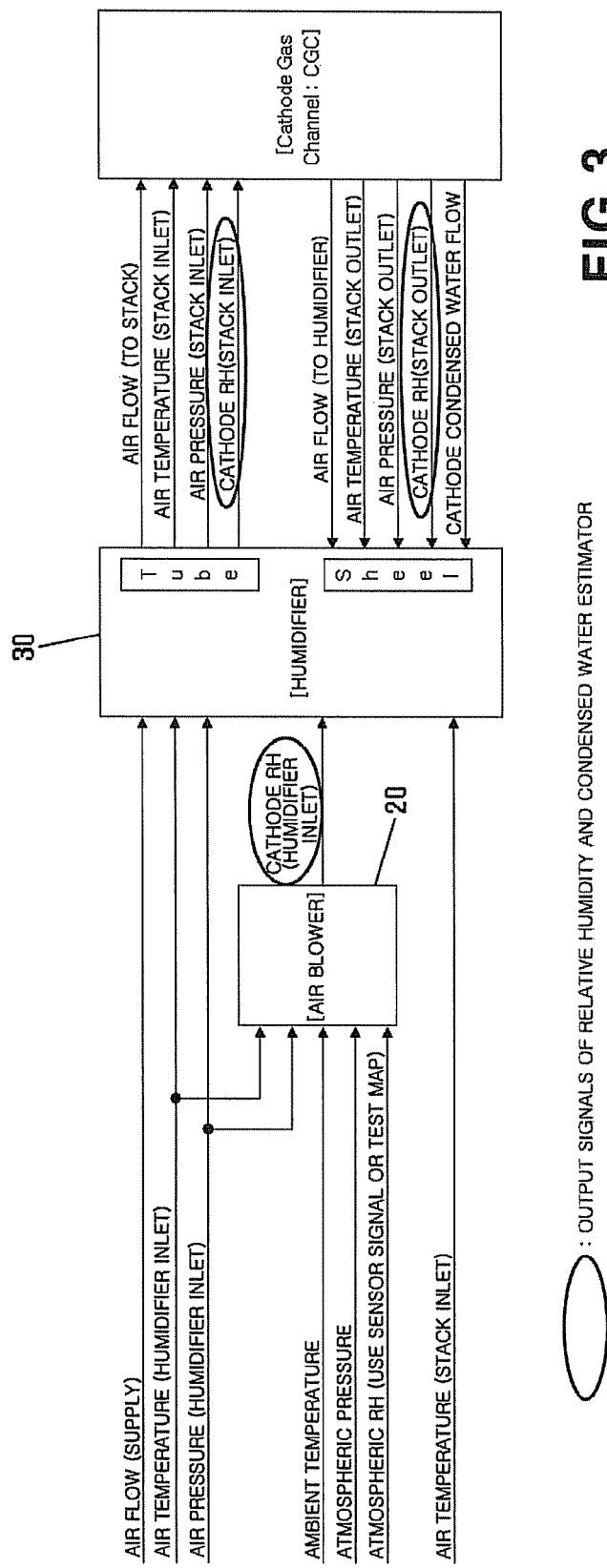
FIG. 3 is a block diagram illustrating an air blower controller of a relative humidity and condensed water estimator for a fuel cell according to an exemplary embodiment of the present invention.

As shown in FIG. 3, the air blower controller 20, which calculates the inflow and the relative humidity, may calculate the cathode relative humidity at the inlet of the humidifier on the assumption that a vapor flow supplied through an air blower is conserved. That is, the air blower controller 20 may receive ambient temperature, atmospheric pressure, and atmospheric relative humidity (using a sensor signal or an experimental map) to calculate the cathode relative humidity at the inlet of the humidifier and send the calculated relative humidity to the humidifier controller 30 as a signal.

The humidifier illustratively includes a shell receiving humid air discharged from the cathode of the stack and a tube (e.g., a hollow fiber polymeric membrane) that is a passage allowing dry air to flow from the air blower to the cathode of the stack and also receives the humid air from the shell to humidify air. The humidifier controller 30 for overall control of fluid flowing in the humidifier illustratively includes the tube control unit 32 which calculates the tube outflow of the humidifier and then calculates air and water balance through proportional-integral (PI) control for estimating a target pressure P1, and the shell control unit 34 that calculates the shell outflow of the humidifier and then calculates air and water balance through PI control for estimating a target pressure P2.

Figure 4A:
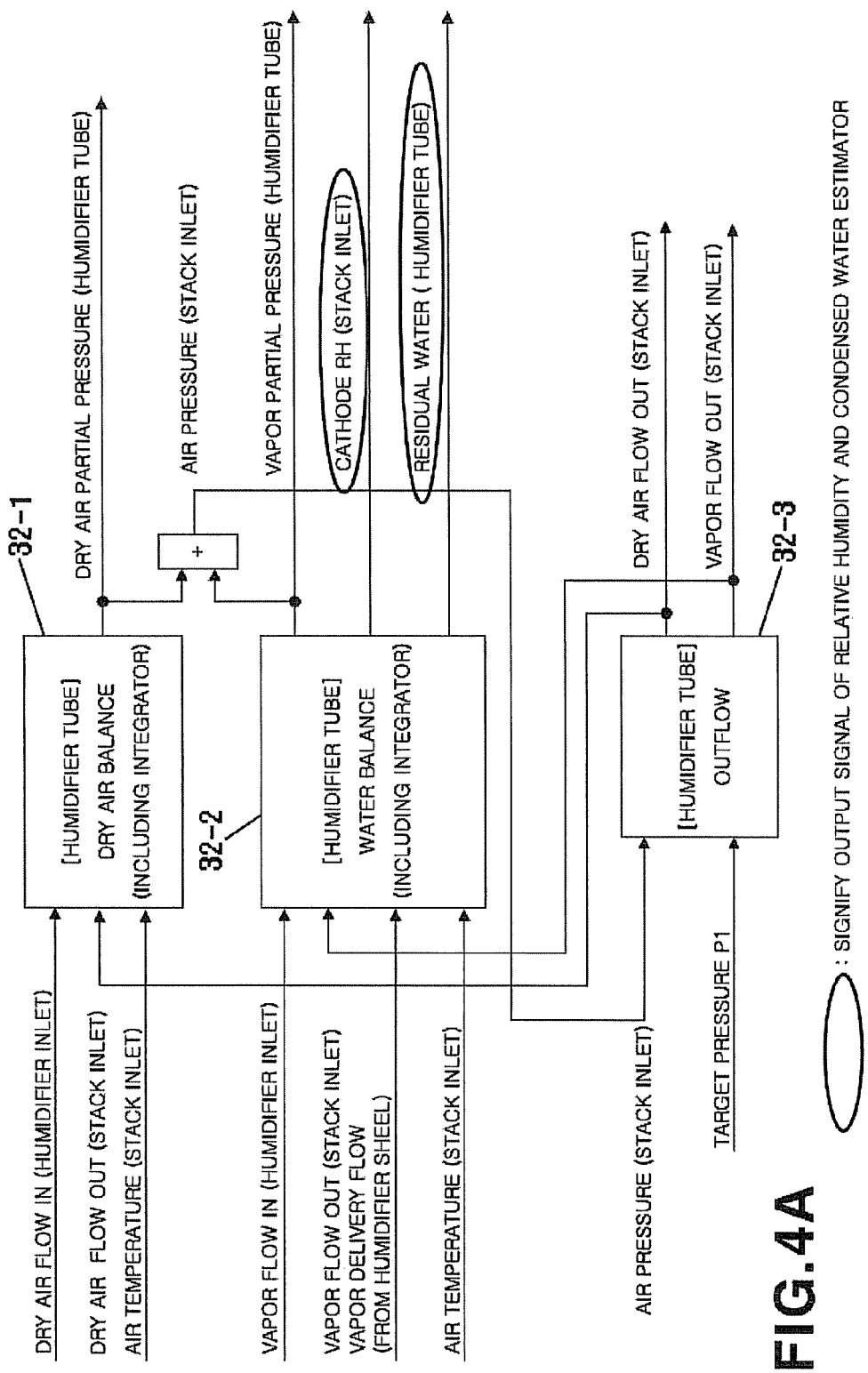
FIGS. 4A and 4B are block diagrams illustrating a humidifier controller of a relative humidity and condensed water estimator for a fuel cell according to an exemplary embodiment of the present invention.

As shown in FIG. 4A, the tube control unit 32 of the humidifier controller 30 illustratively includes a dry air balance calculation unit 32-1, a water balance calculation unit 32-2, and an outflow calculation unit 32-3. The dry air balance calculation unit 32-1 illustratively includes an integrator that receives a dry air inflow at the inlet of the humidifier, air temperature at the cathode inlet of the stack and a dry air outflow which is bypassing the humidifier tube without being humidified, and that calculates a dry air partial pressure at the humidifier tube. The water balance calculation unit 32-2 illustratively includes an integrator that receives a vapor inflow at the inlet of the humidifier, a vapor outflow from the humidifier shell at the inlet of the stack, air temperature at the inlet of the stack, and that calculates a vapor partial pressure at the humidifier tube, cathode relative humidity at the inlet of the stack, and a residual water of the humidifier tube. The outflow calculation unit 32-3 may calculate a dry air outflow at the inlet of the stack and a vapor outflow at the inlet of the stack, based on the air pressure and the target pressure P1 at the inlet of the stack.

In this case, the vapor outflow from the humidifier shell may be calculated using a diffusion equation by a difference between water activities of the humidifier tube and shell. The outflow, that is, the dry air outflow at the inlet of the stack and the vapor outflow at the inlet of the stack, may be calculated by applying PI control for estimating the air pressure (at the inlet of the stack) as the target pressure P1. The target pressure PI may utilize air pressure (stack inlet) sensor data or air flow-based map data.

Figure 4B:
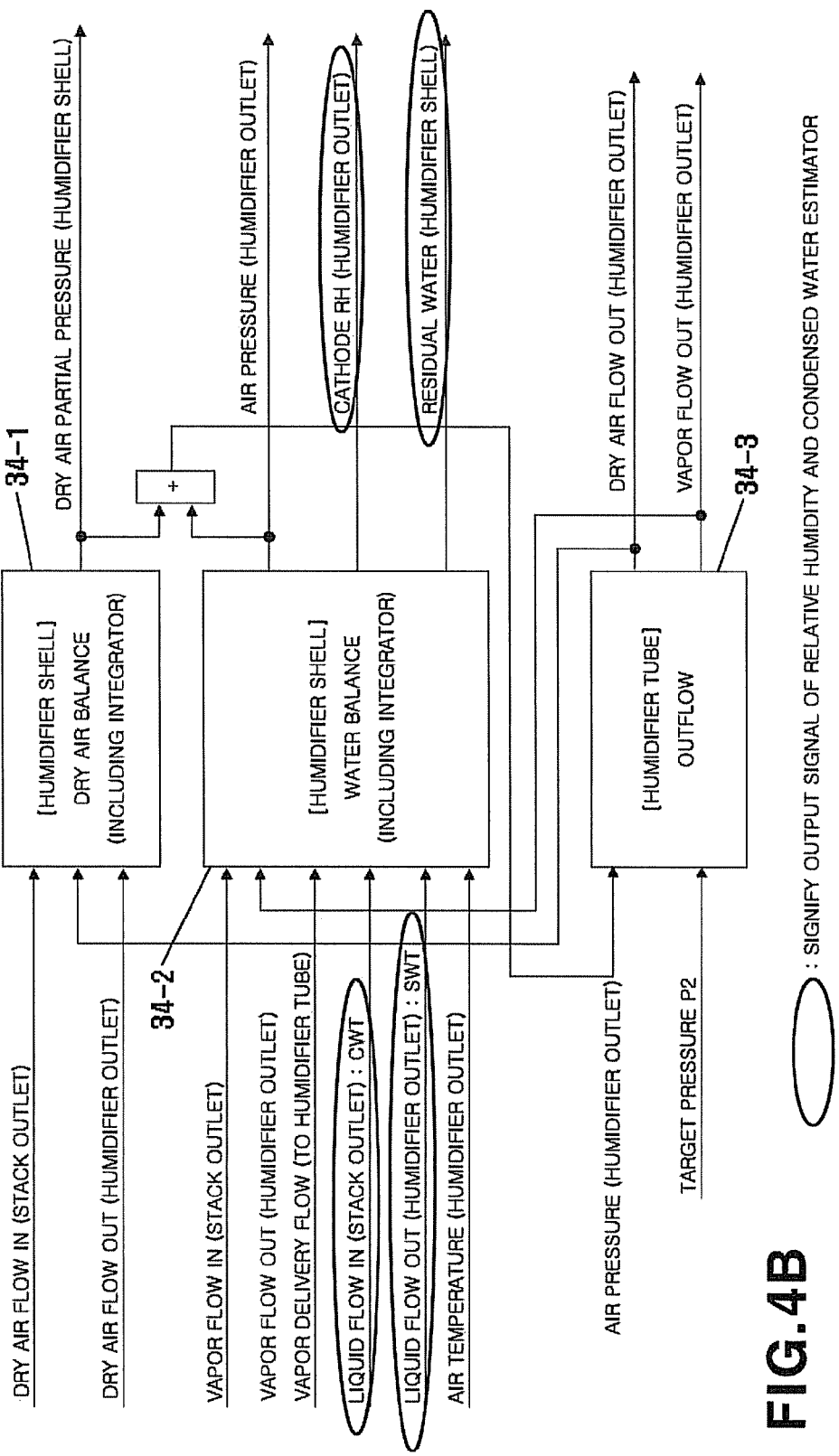

As shown in FIG. 4B, the shell control unit 34 of the humidifier controller 30 illustratively includes a dry air balance calculation unit 34-1, a water balance calculation unit 34-2, and an outflow calculation unit 34-3. The dry air balance calculation unit 34-1 illustratively includes an integrator that receives a dry air inflow at the outlet of the stack, a dry air outflow at the outlet of the humidifier, and air temperature at the outlet of the humidifier, and that calculates a dry air partial pressure at the humidifier shell. The water balance calculation unit 34-2 illustratively includes an integrator that receives a vapor inflow at the outlet of the stack, a vapor outflow at the outlet of the humidifier, a vapor delivery flow delivered to the humidifier tube, a liquid inflow at the outlet of the stack, a liquid outflow at the outlet of the humidifier, and air temperature at the outlet of the humidifier, and that calculates a vapor partial pressure at the humidifier shell, cathode relative humidity at the outlet of the humidifier, and a residual water of the humidifier shell. The outflow calculation unit 34-3 may calculate a dry air outflow at the outlet of the humidifier and a vapor outflow at the outlet of the humidifier, based on the air pressure and the target pressure P2 at the outlet of the humidifier.

In this case, the vapor delivery flow delivered to the humidifier tube may be identical to the vapor delivery flow delivered from the humidifier shell. The outflow, that is, the dry air outflow at the outlet of the humidifier and the vapor outflow at the outlet of the humidifier, may be calculated by applying PI control for estimating the air pressure (at the outlet of the humidifier) as the target pressure P2. Also, the target pressure P2 may utilize air pressure (at the outlet of the humidifier) sensor data or air flow-based map data, and the air temperature (at the outlet of the humidifier) may utilize values calculated based on the energy balance equation, using sensor data or air temperature sensor value at the inlet of the humidifier and the inlet/outlet of the stack On the other hand, the liquid inflow at the outlet of the stack may signify a flow that is trapped in the cathode water trap (CWT), and the liquid outflow at the outlet of the humidifier may signify a flow that is trapped in the humidifier shell water trap (SWT). If the cathode relative humidity at the outlet of the humidifier is smaller than about 100%, shell water trap (SWT)=cathode water trap (CWT)×α, where α ranges from about 0 to about 1.

Alternatively, if the cathode relative humidity at the outlet of the humidifier is equal to or greater than about 100%, shell water trap (SWT)=cathode water trap (CWT)×α+humidifier shell net water flow×β, where α ranges from about 0 to about 1, and β ranges from about 0 to about 1.

Here, the stack controller 50, as shown in FIG. 2, illustratively includes a cathode gas channel (CGC) control unit 51, a cathode gas diffusion layer (CGDL) control unit 52, a cathode catalyst layer (CCL) control unit 53, a membrane layer (MEM) control unit 54, an anode catalyst layer (ACL) control unit 55, an anode gas diffusion layer (AGDL) control unit 56 and an anode gas channel (AGC) control unit 57. The CGC control unit 51 calculates the outflow of a cathode gas channel of the stack through PI control for estimating a target pressure P3, and then calculates the air and water balance. The CGDL control unit 52 calculates the movement of air and water by diffusion and capillary phenomena of the gas diffusion layer by calculating the concentration of air and water. The CCL control unit 53 calculates generated water and calculates a voltage (parameter: current, temperature, oxygen partial pressure, and hydrogen partial pressure) and residual water through an electrochemical reaction. The MEM control unit 54 calculates the water concentration of a membrane by osmotic drag, back diffusion, and heat pipe, and calculates the amount of water moved to the cathode and anode catalyst layers. The ACL control unit 55 calculates the residual water of the anode catalyst layer. The AGDL control unit 56 calculates the movement of air and water by diffusion and capillary phenomena of the gas diffusion layer by calculating the concentration of hydrogen and water. Finally, the AGC control unit 57 calculates the outflow of an anode gas channel of the stack through PI control for estimating a target pressure P5, and calculate the air and water balance.

Figure 5A:
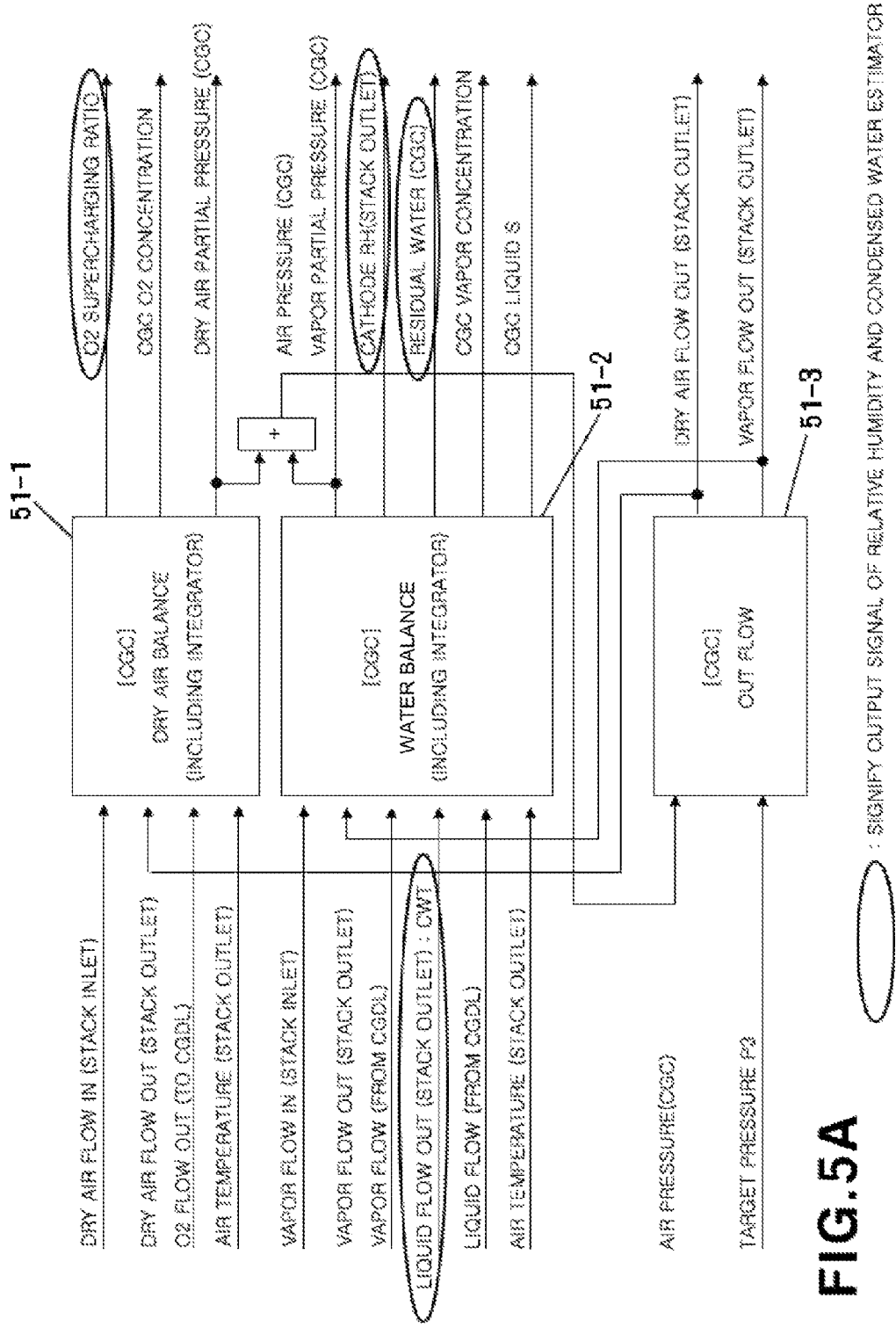
FIGS. 5A through 5G are block diagrams illustrating a stack controller of a relative humidity and condensed water estimator for a fuel cell according to an exemplary embodiment of the present invention.

As shown in FIG. 5A, the cathode gas channel (CGC) control unit 51 of the stack controller 50 illustratively includes a dry air balance calculation unit 51-1 including an integrator receiving dry air inflow at the inlet of the stack, dry air outflow at the outlet of the stack, oxygen outflow with respect to the cathode gas diffusion layer (CGDL), and air temperature at the outlet of the stack to calculate oxygen overcharging ratio, oxygen concentration of the cathode gas channel, and dry air partial pressure of the cathode gas channel. The stack CGC control unit 51 also illustratively includes a water balance calculation unit 51-2 and an outflow calculation unit 51-3. More specifically, the water balance calculation unit 51-2 illustratively includes an integrator receiving vapor inflow at the inlet of the stack, vapor outflow at the outlet of the stack, vapor flow from the cathode gas diffusion layer (CGDL), liquid outflow at the outlet of the stack, liquid flow from the cathode gas diffusion layer, and air temperature at the outlet of the stack to calculate vapor partial pressure of the cathode gas channel, cathode relative humidity at the outlet of the stack, residual water of the cathode gas channel, vapor concentration of the cathode gas channel, and liquid S (CGC Liquid S=(s−s_im)/(1−s_im)). The outflow calculation unit 51-3 calculates a dry air outflow at the outlet of the stack and vapor outflow at the outlet of the stack, based on the target pressure P3 and the air pressure of the cathode gas channel (CGC).

In this case, the outflow, that is, the dry air outflow at the outlet of the stack and the vapor outflow at the outlet of the stack, may be calculated by applying PI control for estimating the air pressure (at the outlet of the stack) as the target pressure P3. Also, the target pressure P3 may utilize air pressure (at the outlet of the stack) sensor data and air flow-based map data, and the air temperature (at the outlet of the stack) may utilize sensor data or stack cooling water inlet/outlet temperature-based map data.

The liquid outflow of the outlet of the stack is a flow that is trapped in the cathode water trap (CWT). If the cathode relative humidity of the outlet of the stack is smaller than about 100%, cathode water trap (CWT)=liquid flow from cathode gas diffusion layer×α, where α ranges from about 0 to about 1.

If the cathode relative humidity of the outlet of the stack is greater than about 100%, cathode water trap (CWT)=liquid flow from cathode gas diffusion layer×α+cathode gas channel (CGC) shell net water flow×β, where α ranges from about 0 to about 1, and β ranges from about 0 to about 1.

If s>s_im, cathode gas channel liquid S (CGC Liquid S)= (s−s_im)/(1−s_im). If s≤s_im, S (CGC Liquid S)=0. Here, s=residual liquid volume of cathode gas channel divided by the volume of cathode gas channel, and s_im signifies immobile saturation that is a reference condition in which liquid flow is generated in the capillary phenomenon.

Figure 5B:
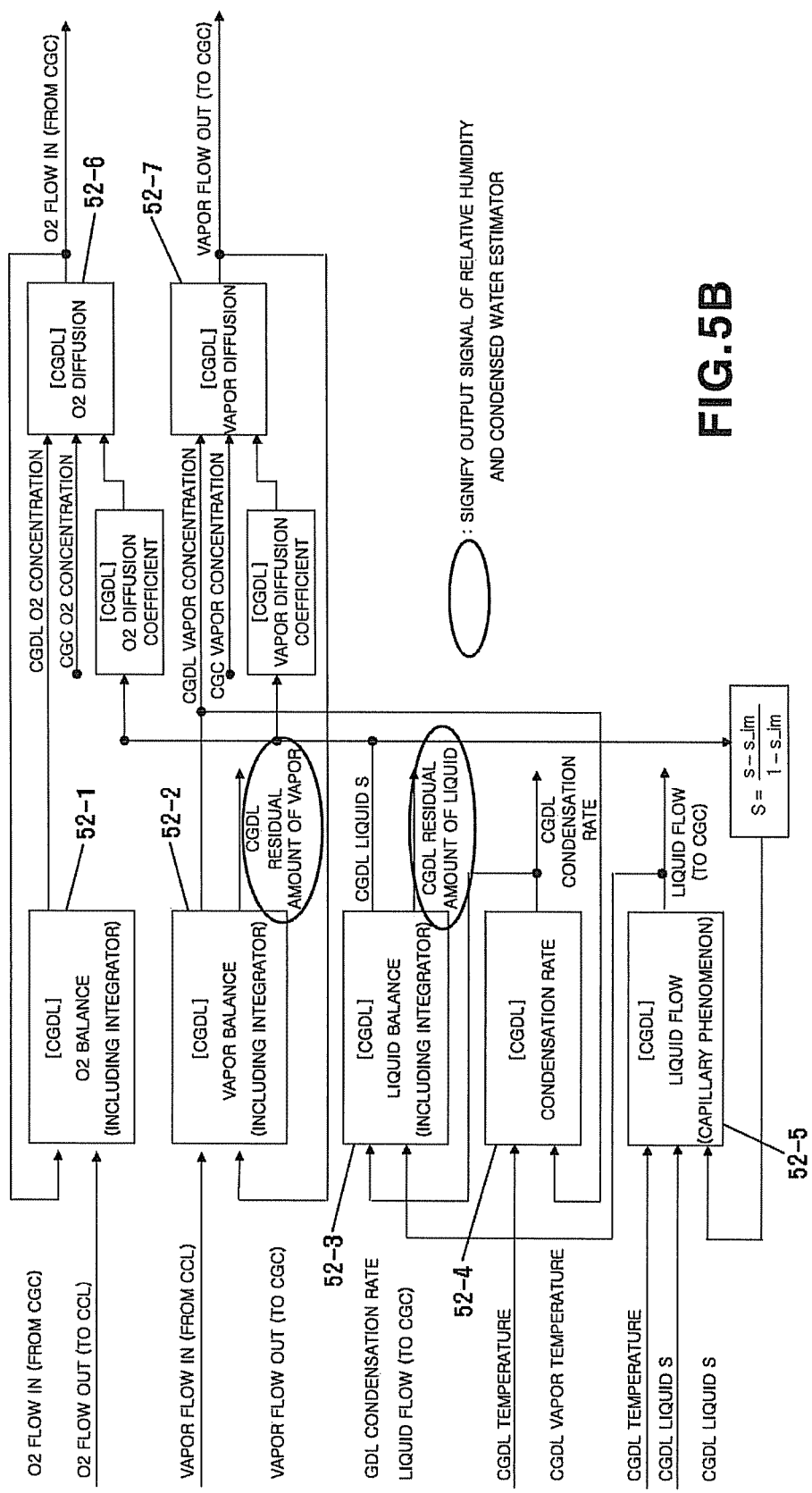

As shown in FIG. 5B, the cathode gas diffusion layer (CGDL) control unit 52 of the stack controller 50 illustratively includes an oxygen balance control unit 52-1, a vapor balance control unit 52-2, a liquid balance control unit 52-3, a condensation calculation unit 52-4, a liquid flow calculation unit 52-5, an oxygen diffusion calculation unit 52-6 and a vapor diffusion calculation unit 52-7. The vapor balance control unit 52-2 includes an integrator that calculates the oxygen concentration of the cathode gas diffusion layer (CGDL), based on oxygen inflow from the cathode gas channel and oxygen outflow to the cathode catalyst layer (CCL). The vapor balance control unit 52-2 includes an integrator that calculates the residual amount of vapor of the cathode gas diffusion layer (CGDL), based on vapor inflow from the cathode catalyst layer (CCL) and vapor outflow to the cathode gas channel (CGC). Additionally, the liquid balance control unit 52-3 includes an integrator calculating the residual amount of liquid of the cathode gas diffusion layer (CGDL), based on condensation rate of the cathode gas diffusion layer and liquid flow to the cathode gas channel Furthermore, the condensation calculation unit 52-4 calculates the condensation rate of cathode gas diffusion layer (CGDL) based on temperature and vapor concentration of the cathode gas diffusion layer (CGDL) and the liquid flow calculation unit 52-5 calculates liquid flow of the cathode gas channel based on liquid S (CGDL Liquid S=(s−s_im)/(1−s_im)) and temperature of the cathode gas diffusion layer, and cathode gas channel liquid S (CGC Liquid S), an oxygen diffusion calculation unit 52-6 calculates oxygen inflow from the cathode gas channel based on oxygen concentration of the cathode gas diffusion layer, oxygen concentration of the cathode gas channel, and oxygen diffusion coefficient of the cathode gas diffusion layer. Finally, the vapor diffusion calculation unit 52-7 calculates vapor outflow to the cathode gas channel based on vapor concentration of the cathode gas diffusion layer, vapor concentration of the cathode gas channel, and vapor diffusion coefficient of the cathode gas diffusion layer.

In this case, the temperature of the cathode gas diffusion layer (CGDL) may utilize stack cooling water inlet/outlet temperature-based map data.

If s>s_im, cathode gas diffusion layer liquid S (CGDL Liquid S)=(s−s_im)/(1−s_im). If s≤s_im, S (CGDL Liquid S)=0. Here, s equals residual liquid volume of cathode gas diffusion layer (CGDL) divided by the pore volume of cathode gas diffusion layer (CGDL), and s_im signifies immobile saturation that is a reference condition in which liquid flow is generated in the capillary phenomenon. Under the capillary phenomenon, if s>s_im, liquid flow may be generated by a difference of liquid S of adjacent layers.

On the other hand, the condensation rate of the cathode gas diffusion layer (CGDL) may be generated in proportion to a difference between saturation pressure according to the temperature of the cathode gas diffusion layer and the vapor pressure according to the concentration of the vapor of the cathode gas diffusion layer (CGDL vapor). Also, as liquid of the cathode gas diffusion layer (CGDL) increases (that is, CGDL liquid s increases), the diffusion coefficient of oxygen and vapor may be reduced.

Figure 5C:
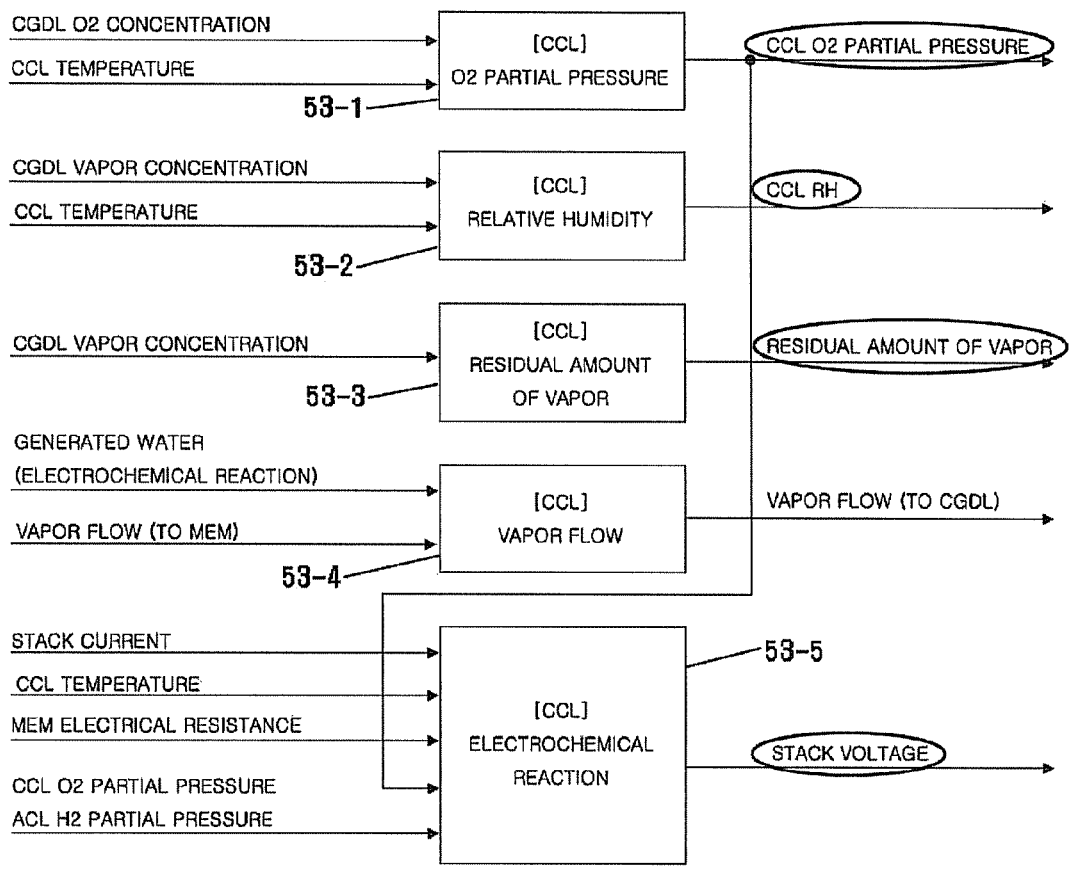

As shown in FIG. 5C, the cathode catalyst layer (CCL) control unit 53 of the stack controller 50 illustratively includes an oxygen partial pressure calculation unit 53-1, a relative humidity calculation unit 53-2, a residual vapor calculation unit 53-3, a vapor flow calculation unit 53-4 and a voltage calculation unit 53-5. The oxygen partial pressure calculation unit 53-1 calculates an oxygen partial pressure of the cathode catalyst layer (CCL) based on the oxygen concentration of the cathode gas diffusion layer (CGDL) and the temperature of the cathode catalyst layer (CCL). The relative humidity calculation unit 53-2 calculates the relative humidity of the cathode catalyst layer (CCL) based on the temperature of the cathode catalyst layer (CCL). The residual vapor calculation unit 53-3 calculates the residual amount of vapor of the cathode catalyst layer (CCL) based on the vapor concentration of the cathode gas diffusion layer (CGDL). The vapor flow calculation unit 53-4 calculates the vapor flow to the cathode gas diffusion layer based on the generated water flow by the electrochemical reaction of the stack and the vapor flow to the membrane. Lastly, the voltage calculation unit 53-5 calculates a voltage by the electrochemical reaction of the stack based on the stack current, the temperature of the cathode catalyst layer, the electrical resistance of the membrane, the oxygen partial pressure of the cathode catalyst layer, and the hydrogen partial pressure of the anode catalyst layer.

Figure 5D:
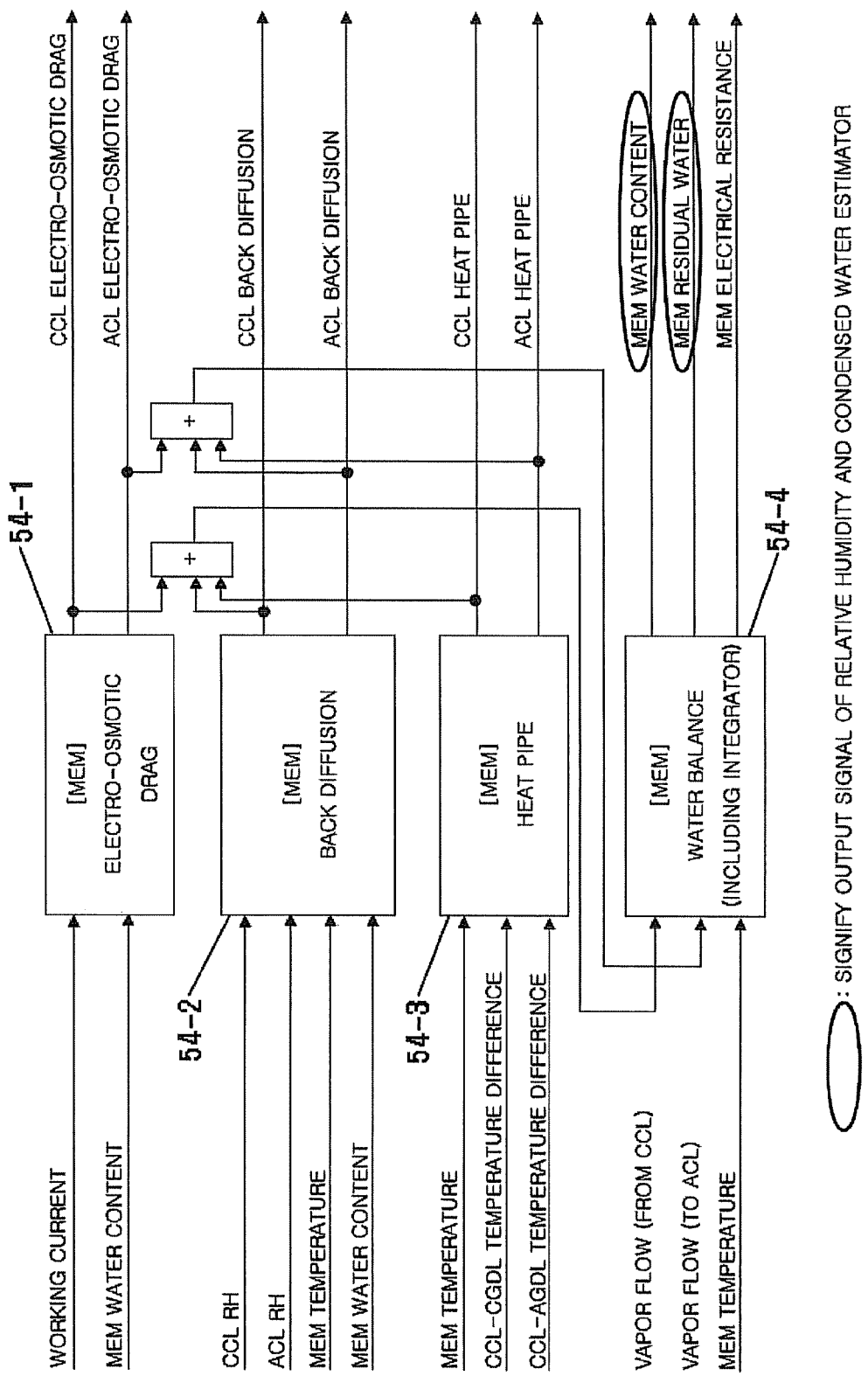

As shown in FIG. 5D, the membrane layer (MEM) control unit 54 of the stack controller 50 illustratively includes an electro-osmotic drag detection unit 54-1, back-diffusion detection unit 54-2, a heat pipe detection unit 54-3 and a water balance calculation unit 54-4 outputting electro-osmotic drag of the cathode catalyst layer and the anode catalyst layer based on working current and water content of the membrane. The back-diffusion detection unit 54-2 detects back-diffusion of the cathode catalyst layer and the anode catalyst layer based on the relative humidity of the cathode catalyst layer, the relative humidity of the anode catalyst layer, and the temperature and water content of the membrane. The heat pipe detection unit 54-3 detects water movement state of a heat pipe mechanism based on the temperature of the membrane, a temperature difference between the cathode catalyst layer and the cathode gas diffusion layer, and a temperature difference between the cathode catalyst layer and the anode gas diffusion layer. Lastly, the water balance calculation unit

54-4 includes an integrator that receives an electro-osmotic drag output signal of the electro-osmotic drag detection unit 54-1 and a back-diffusion output signal of the back-diffusion detection unit 54-2, an output signal of the heat pipe detection unit 54-3, and the temperature of the membrane to calculate the residual water, electrical resistance, and water content of the membrane.

In the membrane layer (MEM) control unit 54, the temperature of the membrane (MEM) may utilize the stack cooling water inlet/outlet temperature-based map data. The temperature difference between the cathode catalyst layer (CCL) and the cathode gas diffusion layer (CGDL), the temperature difference between the cathode catalyst layer (CCL) and the anode gas diffusion layer (AGDL) may utilize the working current and the stack cooling water inlet/outlet temperature-based map data, and the vapor flow from the cathode catalyst layer and the vapor flow to the anode catalyst layer may be calculated by summing the electro-osmotic drag, back-diffusion rate, and heat pipe output values of the cathode catalyst layer and the anode catalyst layer, respectively.

On the other hand, the electro-osmotic drag water movement mechanism refers to water movement in which hydrogen ions (H+) pass through the membrane according the working current, and the back diffusion water movement mechanism refers to water movement according to water activity of the cathode catalyst layer and the anode catalyst layer of the both ends of the membrane. The heat-pipe water movement mechanism refers to water movement (from hot layer to cold layer) by temperature gradient between layers in a saturated state of the membrane.

Also, the membrane water content, which is a representative factor for determining the membrane dry-out and the flooding, is a dimensionless factor between about 0 and about 16.8. As the membrane water content decreases, the membrane becomes dried out.

Figure 5E:
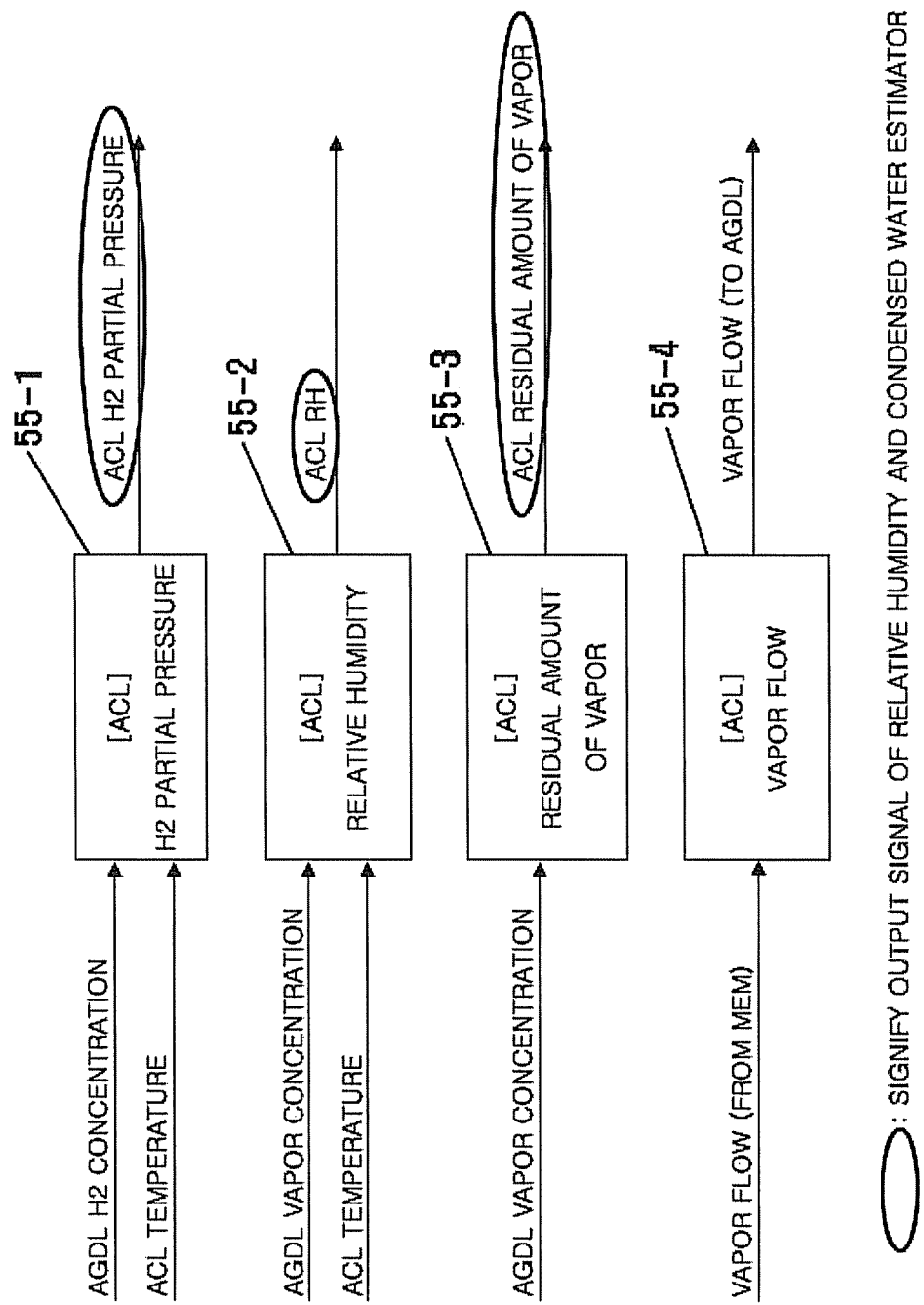

As shown in FIG. 5E, the anode catalyst layer (ACL) control unit 55 of the stack controller 50, which calculates the residual water of the anode catalyst layer, illustratively includes a hydrogen partial pressure calculation unit 55-1, a relative humidity calculation unit 55-2, a residual vapor calculation unit 55-3 and a vapor flow calculation unit 55-4. The hydrogen partial pressure calculation unit 55-1 calculates the hydrogen partial pressure of the anode catalyst layer (ACL) based on hydrogen concentration of the anode gas diffusion layer (AGDL) and temperature of the anode catalyst layer (ACL). The relative humidity calculation unit 55-2 calculates relative humidity of the anode catalyst layer (ACL) based on vapor concentration of the anode gas diffusion layer (AGDL) and temperature of the anode catalyst layer (ACL). The residual vapor calculation unit 55-3 calculates the residual amount of vapor of the anode catalyst layer (ACL) based on vapor concentration of the anode gas diffusion layer (AGDL), and the vapor flow calculation unit 55-4 calculates vapor flow into the anode gas diffusion layer based on vapor flow from the membrane. In this case, the temperature of the anode catalyst layer may utilize the stack cooling water inlet/outlet temperature-based map data.

Figure 5F:
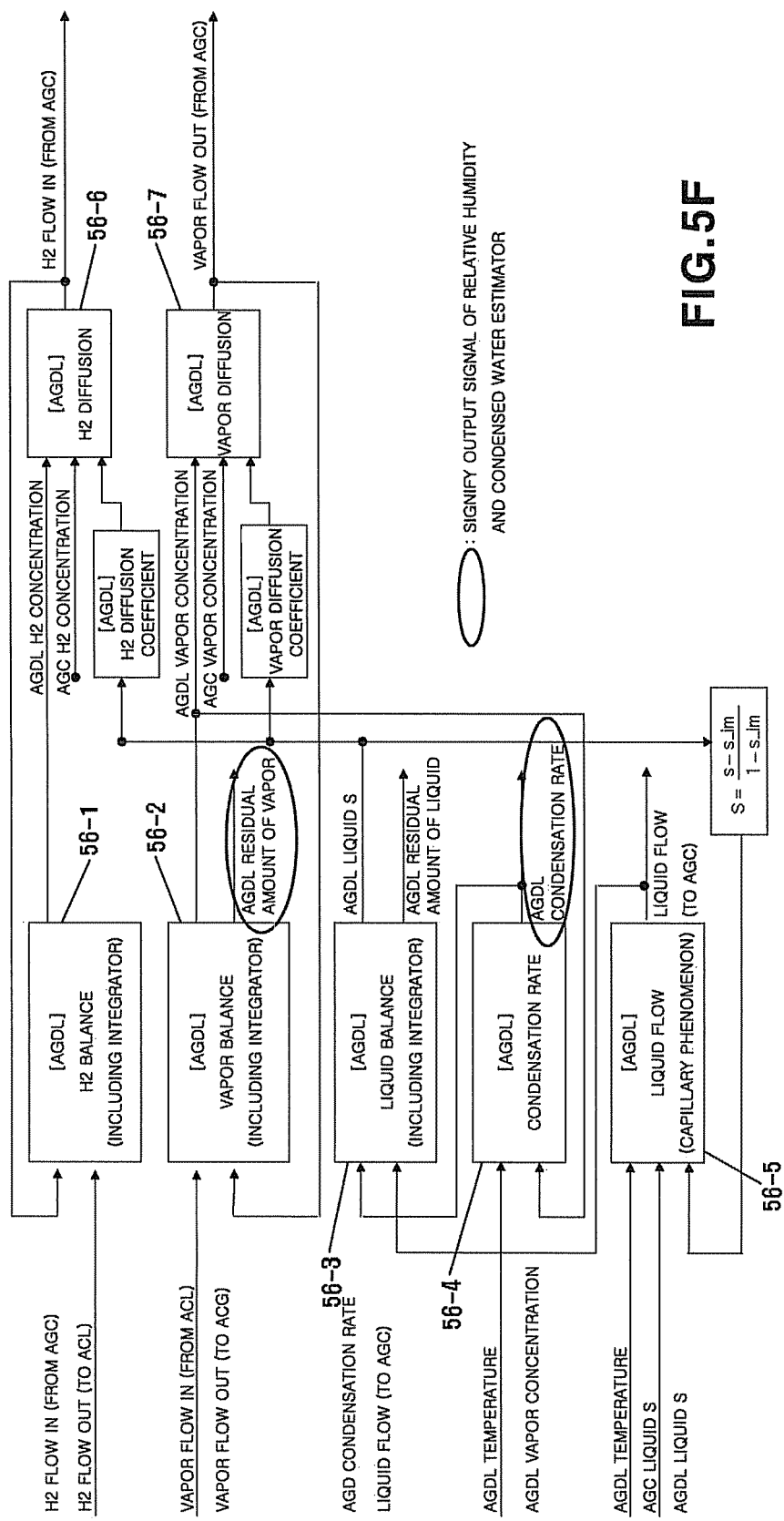

As shown in FIG. 5F, the anode gas diffusion layer (AGDL) control unit 56 of the stack controller 50 illustratively includes an hydrogen balance control unit 56-1, a vapor balance control unit 56-2, a liquid balance control unit 56-3, a condensation calculation unit 56-4, and a liquid flow calculation unit 56-5. The hydrogen balance control unit 56-1 includes an integrator that calculates the hydrogen concentration of the anode gas diffusion layer (AGDL), based on hydrogen inflow from the anode gas channel (AGC) and hydrogen outflow to the anode catalyst layer (ACL). The vapor balance control unit 56-2 includes an integrator that calculates the residual water and concentration of vapor of the anode gas diffusion layer (AGDL), based on vapor inflow from the anode catalyst layer (ACL) and vapor outflow to the anode gas channel (AGC). The liquid balance control unit 56-3 includes an integrator to calculate the residual amount of liquid of the anode gas diffusion layer (AGDL), based on condensation rate of the anode gas diffusion layer (AGDL) and liquid flow to the anode gas channel (AGC). The condensation calculation unit 56-4 calculates the condensation rate of anode gas diffusion layer (AGDL) based on temperature and vapor concentration of the anode gas diffusion layer (AGDL). The liquid flow calculation unit 56-5 calculates liquid flow of the anode gas channel based on liquid S (AGDL Liquid S=(s−s_im)/(1−s)) and temperature of the anode gas diffusion layer, and anode gas channel liquid S (AGC Liquid S). The hydrogen diffusion calculation unit 56-6 calculates hydrogen inflow from the anode gas channel based on hydrogen concentration of the anode gas diffusion layer, hydrogen concentration of the anode gas channel, and hydrogen diffusion coefficient of the anode gas diffusion layer. The vapor diffusion calculation unit 56-7 calculates vapor outflow to the anode gas channel based on vapor concentration of the anode gas diffusion layer, vapor concentration of the anode gas channel, and vapor diffusion coefficient of the anode gas diffusion layer.

In this case, the temperature of the anode gas diffusion layer (AGDL) may utilize stack cooling water inlet/outlet temperature-based map data.

If s>s_im, anode gas diffusion layer liquid S (AGDL Liquid S)=(s−s_im)/(1−s). If s≤s_im, S (AGDL Liquid S)=0. Here, s (AGDL liquid s)=residual liquid volume of anode gas diffusion layer (AGDL) divided by the pore volume of anode gas diffusion layer (AGDL), and s_im signifies immobile saturation that is a reference condition in which liquid flow is generated in the capillary phenomenon. Under the capillary phenomenon, if s>s_im, liquid flow may be generated by a difference of liquid S of adjacent layers.

On the other hand, the condensation rate of the anode gas diffusion layer (AGDL) may be generated in proportion to a difference between saturation pressure according to the temperature of the anode gas diffusion layer and the vapor pressure according to the concentration of the vapor of the anode gas diffusion layer (AGDL vapor). Also, as liquid of the anode gas diffusion layer (AGDL) increases (that is, AGDL liquid s increases), the diffusion coefficient of hydrogen and vapor may be reduced.

Figure 5G:
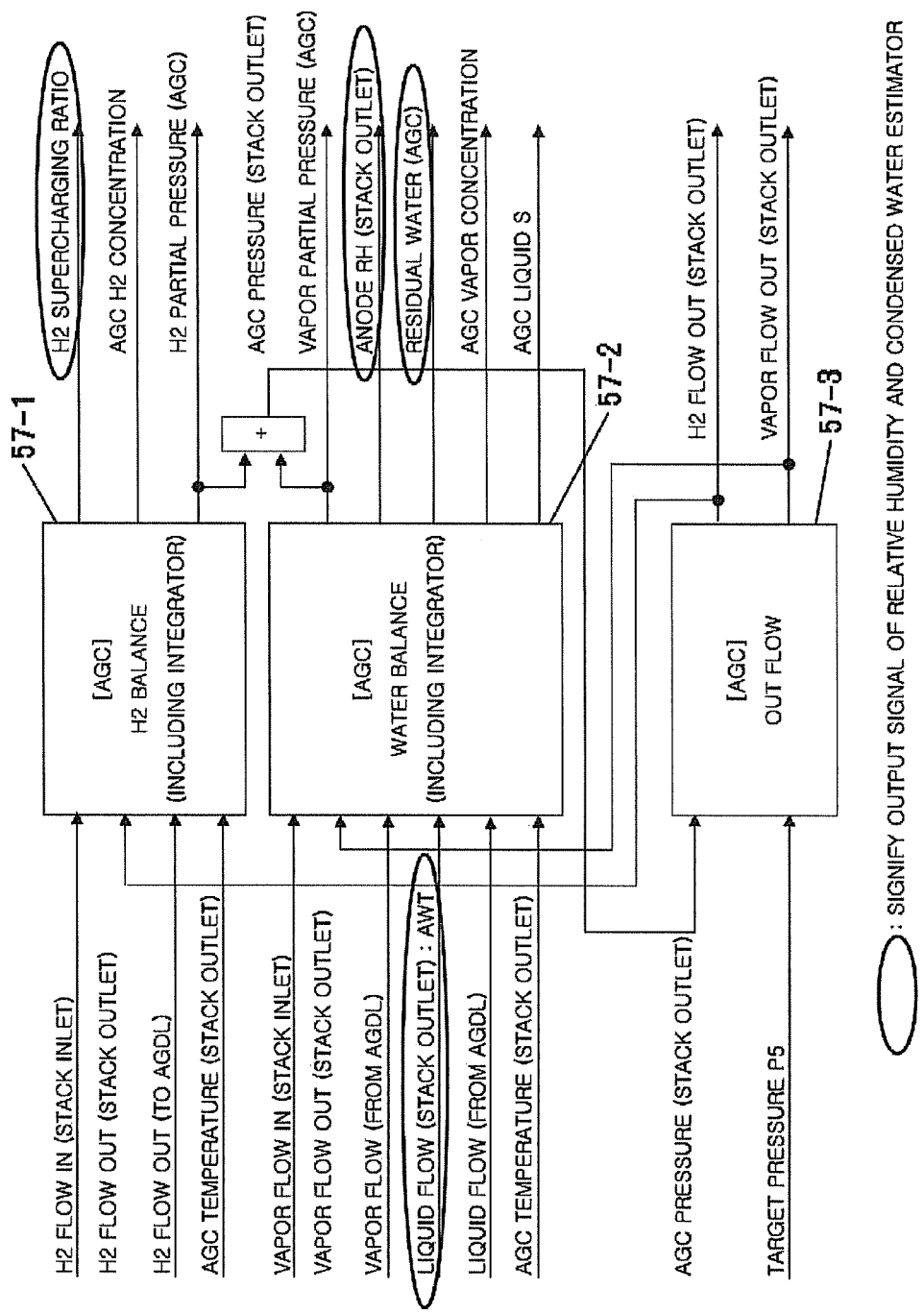

As shown in FIG. 5G, the anode gas channel (AGD) control unit 57 of the stack controller 50 illustratively includes a hydrogen balance calculation unit 57-1, a water balance calculation unit 57-2 and an outflow calculation unit 57-3. The hydrogen balance calculation unit 57-1 includes an integrator that receives hydrogen inflow at the inlet of the stack, hydrogen outflow at the outlet of the stack, hydrogen outflow to the anode gas diffusion layer, anode gas channel (AGC) temperature at the outlet of the stack, and hydrogen outflow at the outlet of the stack to calculate a hydrogen supercharging ratio, a hydrogen concentration of the anode gas channel, and a hydrogen partial pressure of the anode gas channel. The water balance calculation unit 57-2 includes an integrator that receives vapor inflow of the inlet of the stack, vapor outflow of the outlet of the stack, vapor flow from the anode gas diffusion layer (AGDL), liquid outflow at the outlet of the stack, liquid inflow from the anode gas diffusion layer, and anode gas channel (AGC) temperature at the outlet of the stack to calculate vapor partial pressure of the anode gas channel, anode relative humidity at the outlet of the stack, residual water of the anode gas channel, and vapor concentration and liquid S (AGC Liquid S=(s−s_im)/(1−s_im)) of the anode gas channel. Finally, the outflow calculation unit 57-3 calculates hydrogen outflow and vapor outflow at the outlet of the stack, based on the target pressure P5 and the anode gas channel (AGC) pressure at the outlet of the stack.

In this case, the outflow, that is, the hydrogen outflow and the vapor outflow at the outlet of the stack may be calculated by applying PI control for estimating the anode gas channel pressure (at the outlet of the stack) as the target pressure P5. The target pressure P5 may utilize anode gas channel pressure (at the outlet of the stack) sensor data or anode gas channel flow-based map data. The anode gas channel temperature (at the outlet of the stack) may utilize sensor data or stack cooling water inlet/outlet temperature-based map data.

The liquid outflow at the outlet of the stack is a flow that is trapped in an anode water trap (AWT). If the anode relative humidity at the outlet of the stack is smaller than about 100%, anode water trap (AWT)=liquid flow from anode gas diffusion layer×α, where α ranges from about 0 to about 1.

On the other hand, if the anode relative humidity at the outlet of the stack is equal to or greater than about 100%, anode water trap (AWT)=liquid flow from anode gas diffusion layer×α+anode gas channel (AGC) net water flow×β, where α ranges from about 0 to about 1, and β ranges from about 0 to about 1.

If s>s_im, anode gas channel liquid S (AGC Liquid S)=(s−s_im)/(1−s_im). If s≤s_im, AGC Liquid S=0. Here, s=residual liquid volume of anode gas channel divided by the volume of anode gas channel, and s_im signifies immobile saturation that is a reference condition in which liquid flow is generated in the capillary phenomenon.

Figure 6A:
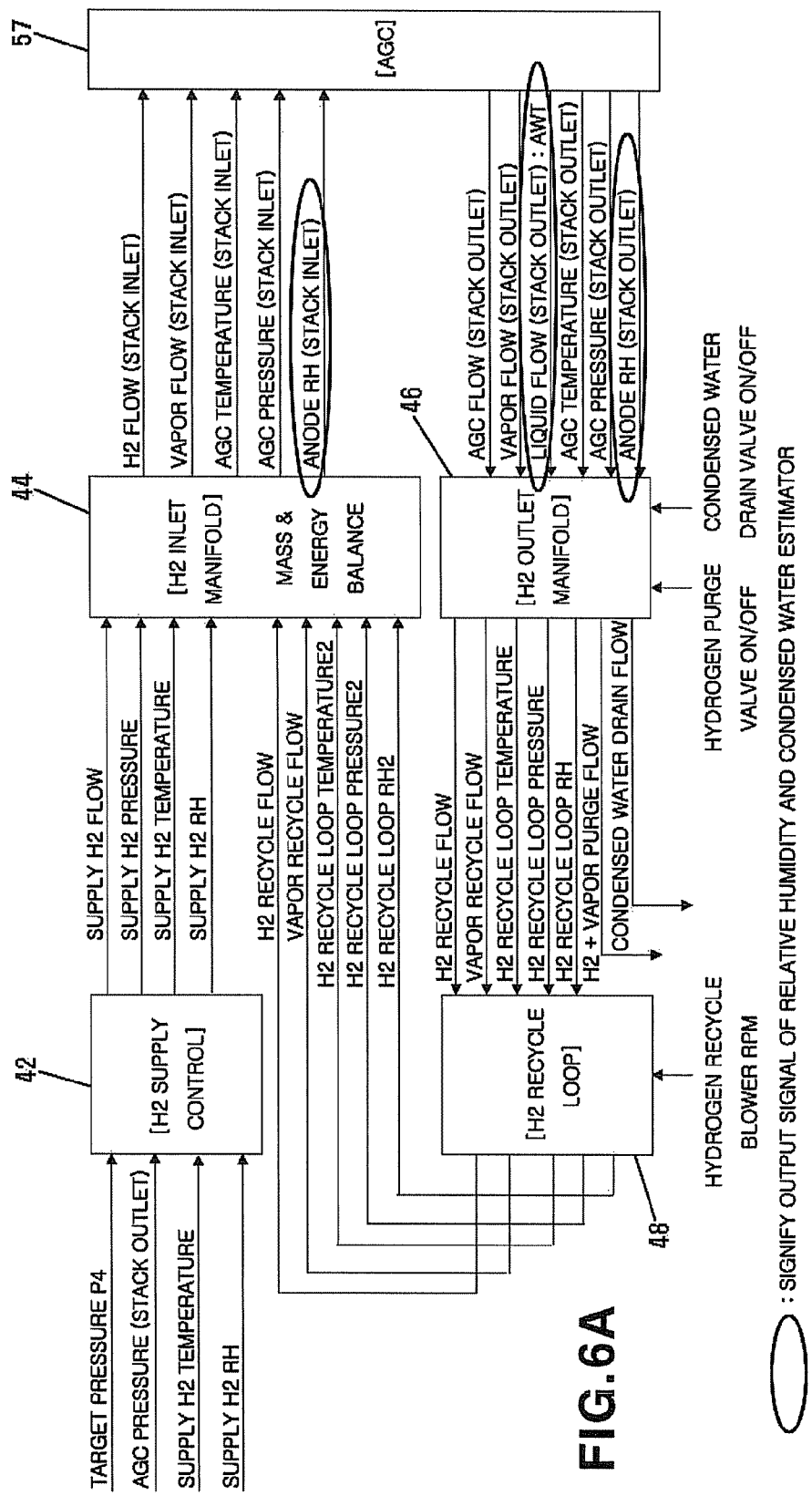
FIGS. 6A and 6B are block diagrams illustrating a fuel processing system controller of a relative humidity and condensed water estimator for a fuel cell according to an exemplary embodiment of the present invention.
Figure 6B:
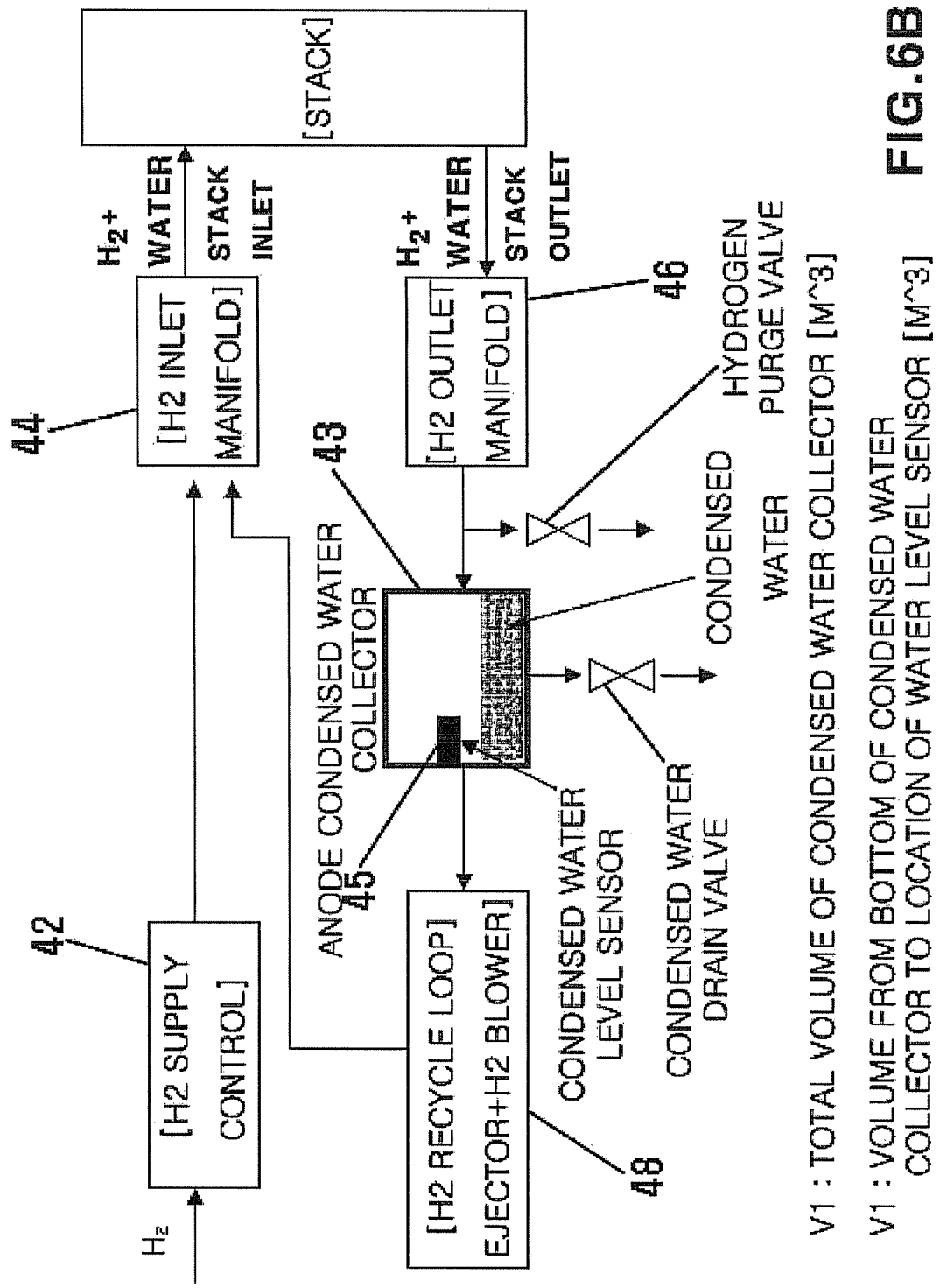

As shown in FIGS. 6A and 6B, the fuel processing system (FPS) controller 40 illustratively includes a hydrogen supply control unit 42 calculating a hydrogen inflow through PI control for estimating a target pressure P4, a hydrogen inlet manifold control unit 44 controlling a mixture ratio between supplied hydrogen and recycled hydrogen, a hydrogen outlet manifold control unit 46 for performing hydrogen purging and condensed water drain control, and a hydrogen recycle loop control unit 48 for controlling an ejector and a recycle blower.

More specifically, the fuel processing system controller 40 illustratively includes the hydrogen supply control unit 42 that receives the target pressure P4, anode gas channel pressure at the outlet of the stack, hydrogen supply temperature, and relative humidity of supplied hydrogen to output hydrogen inflow, hydrogen supply pressure, hydrogen supply temperature, and relative humidity of supplied hydrogen to the hydrogen inlet manifold control unit 44. The hydrogen inlet manifold control unit 44 receives hydrogen inflow, hydrogen supply pressure, hydrogen supply temperature and relative humidity of supplied hydrogen from the hydrogen supply control unit 42, and at the same time receives hydrogen recycle flow, vapor recycle flow, hydrogen second recycle loop temperature, hydrogen second recycle loop pressure, and hydrogen second recycle loop relative humidity from the hydrogen recycle loop control unit 48 to output hydrogen flow at the inlet of the stack, vapor flow at the inlet of the stack, anode gas channel temperature and pressure at the inlet of the stack, and anode relative humidity at the inlet of the stack to the anode gas channel (AGC) control unit 57. The hydrogen outlet manifold control unit 46 receives hydrogen flow at the outlet of the stack, vapor flow at the outlet of the stack, liquid flow at the outlet of the stack, anode gas channel temperature and pressure at the outlet of the stack, and anode relative humidity at the outlet of the stack from the anode gas channel (AGC) control unit 57 to output hydrogen recycle flow, vapor recycle flow, hydrogen first recycle loop temperature, hydrogen first recycle loop pressure, hydrogen first recycle loop relative humidity to the hydrogen recycle loop control unit, and the hydrogen recycle loop control unit 48 receiving hydrogen recycle flow, vapor recycle flow, hydrogen first recycle loop temperature, hydrogen first recycle loop pressure, hydrogen first recycle loop relative humidity from the hydrogen outlet manifold control unit 46 to output hydrogen recycle flow, vapor recycle flow, hydrogen second recycle loop temperature, hydrogen second recycle loop pressure, hydrogen second recycle loop relative humidity.

In the hydrogen recycle loop, the second recycle loop temperature/pressure/relative humidity may be calculated based on heat map according to revolutions per minute (RPM) of the hydrogen recycle blower. Hydrogen and vapor purge flow may be calculated from a nozzle calculation formula by a pressure difference when the hydrogen purge value turns on. The condensed water drain flow may be calculated based on condensed water discharge test map by unit time. The amount of condensed water remaining in the condensed drain port may be calculated from the liquid balance equation in consideration of anode water trap (AWT) inputted into condensed water drain flow.

Also, the hydrogen inflow may be calculated by applying PI control for estimating anode gas channel pressure (utilizing stack outlet anode gas channel pressure-based map) at the inlet of the stack. The target pressure P4 may utilize anode gas channel pressure (at the inlet of the stack) sensor data or anode gas channel flow-based map data. The hydrogen supply temperature may utilize sensor data or map data based on ambient temperature, hydrogen tank temperature, and stack cooling water inlet/outlet temperature.

In this case, the relative humidity of supplied hydrogen may be set to about 0% in consideration of the pure hydrogen condition. The anode gas channel temperature (at the inlet of the stack) may be calculated from the energy balance equation of supplied plus vapor heat and recycle hydrogen plus vapor heat. The anode relative humidity (at the inlet of the stack) may be calculated based on a humidity ratio that is defined as a ratio of vapor flow to hydrogen flow.

Hereinafter, a method for controlling condensed water drain using a relative humidity and condensed water estimator for a fuel cell based on the above-described configuration will be described in detail.

The method for controlling condensed water drain may be achieved using, as indicated using ovals in the drawings, air-side/hydrogen-side relative humidity, air-side/hydrogen-side/humidifier instantaneous and cumulative condensed water ratio, membrane water content ratio, catalyst layer oxygen/hydrogen partial pressure, stack voltage, air-side/hydro-side catalyst layer relative humidity, oxygen/hydrogen supercharging ratio, residual water in the stack, and residual water in the humidifier, among output signals of the relative humidity and condensed water estimator.

The method for controlling anode condensed water drain using the relative humidity and condensed water estimator according to the first and second embodiments of the present invention may perform the control of the drain valve on/off based on condensed water estimates upon abnormality of the water level sensor 45 by calculating the residual amount of condensed water in the anode condensed water collector, using the amount of anode condensed water calculated in the estimator and on/off signals of the drain valve, and then determining whether the water level sensor 45 in the condensed water collector 43 as shown in FIG. 6B is normal.

More specifically, the method illustratively includes determining whether the water level sensor in the condensed water collector is normal by calculating the residual amount of condensed water in the anode condensed water collector, based on anode condensed water (input flow, AWT) calculated in the above estimator and outflow (anode condensed water drain valve on×condensed water outflow per second) calculated using the drain valve on/off signals, and, if abnormal, performing the drain valve on/off control based on the residual condensed water estimate.

In this case, the residual amount of condensed water (calculated value=estimated value) is greater than an amount corresponding to the total volume V1 of the collector of the anode condensed water, there is a possibility that the drain valve is excessively closed due to a failure of the water level sensor. Thus, if cell voltage drop, abnormal operation of the hydrogen recycle blower, and abnormality of anode-side stack inlet/outlet pressure occur due to serious flooding in the stack, it is determined that the water level sensor has failed. Then, condensed water drain valve may be controlled on/off based on the anode water trap (AWT) estimate to maintain residual condensed water near the water level sensor.

Also, when the residual amount of condensed water (calculated value=estimated value) is equal to or smaller than about 0, there is a possibility that the drain valve is excessively opened due to a failure of the water level sensor. Thus, if the hydrogen utilization rate is reduced and hydrogen leakage sensor alarms due to leakage of hydrogen instead of condensed water, it may be determined that the water level sensor has failed. Then, condensed water drain valve may be controlled on/off control based on the anode water trap (AWT) estimate to maintain residual condensed water near the water level sensor.

The methods for controlling anode condensed water drain using a relative humidity and condensed water estimator according to first and second embodiments of the present invention will be described in further detail below.

First Embodiment

Figure 7A:
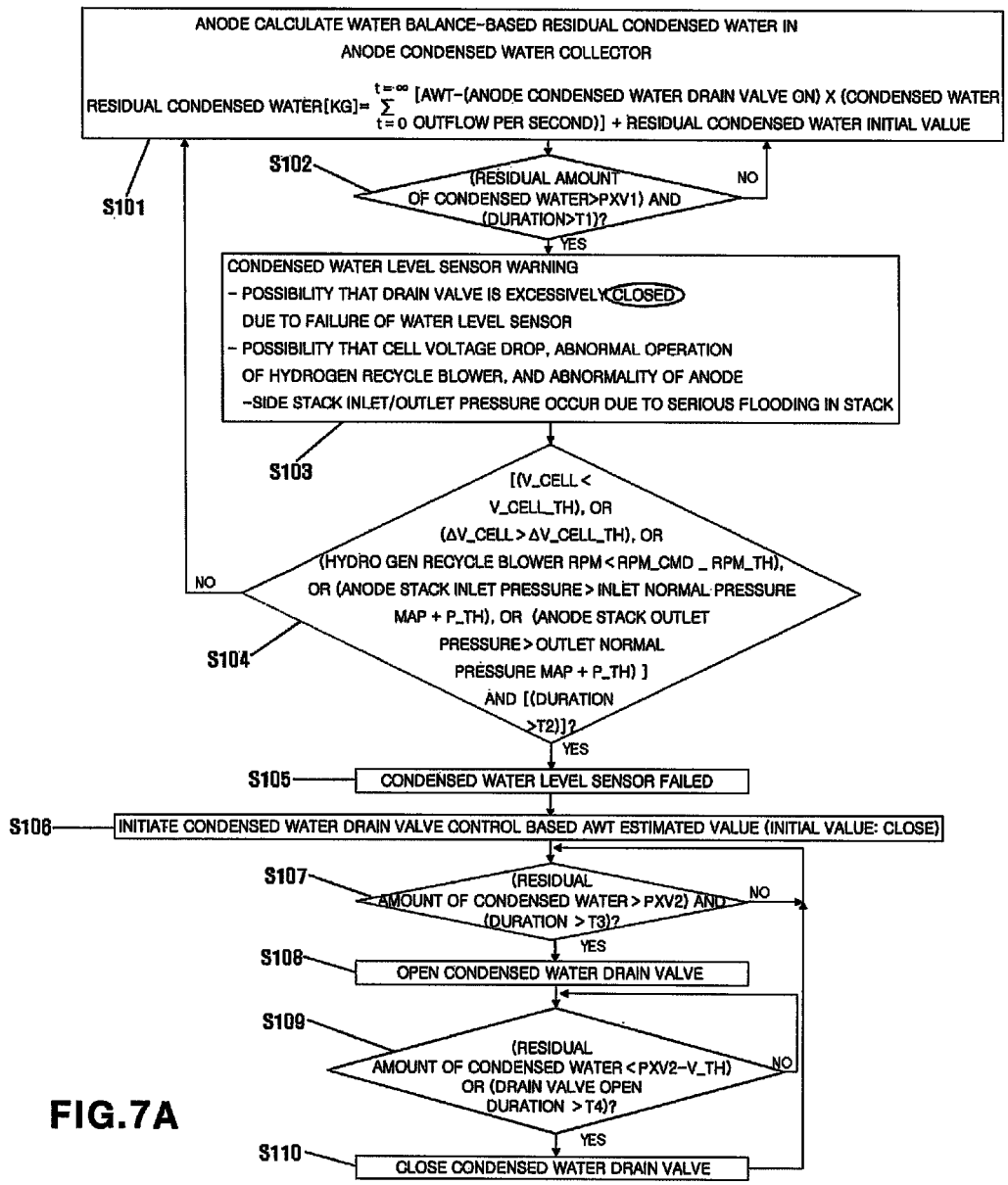
FIGS. 7A and 7B are flowcharts illustrating methods for controlling condensed water drain using a relative humidity and condenser water estimator for a fuel cell according first and second exemplary embodiments of the present invention.

As shown in the flowchart of FIG. 7A, in a first step (S101), a residual amount of condensed water based on water balance in the anode condensed water collector may be calculated using Equation (1).

$$\text{Residual condensed water[kg]} = \sum_{t=0}^{t=\infty} [AWT - (\text{Anode condensed water drain valve on}) \times (\text{Condensed water outflow per second})] \times \Delta t + \text{Residual condensed water initial value} \quad (1)$$

In a further step (S102), the residual amount of condensed water may be compared with a product of the density ($\rho$[kg/m^3]) of condensed water and the total volume (V1[m^3]) of the condensed water collector, and a duration ($\Delta t$) may be compared with a reference value (t1).

In a further step (S103), if the residual amount of condensed water is greater than the product of the density ($\rho$[kg/m^3]) of condensed water and the total volume (V1[m^3]) of the condensed water collector, and the duration ($\Delta t$) is greater than the reference value (t1), it is determined as a warning stage of a condensed water level sensor.

As the drain valve is excessively closed due to a failure of the water level sensor, cell voltage drop, abnormal operation of hydrogen recycle blower, and anode stack inlet/outlet pressure abnormality may occur due to serious flooding in the stack.

Accordingly, if V_cell is smaller than V_cell_TH, $\Delta$V_cell is greater than $\Delta$V_cell_TH, hydrogen recycle blower RPM is smaller than RPM_cmd_RPM_TH, anode stack inlet pressure is greater than inlet normal pressure map plus P_TH, or anode stack outlet pressure is greater than outlet normal pressure map plus P_TH, and the duration is greater than a reference value t2 in a next step (S104), it may be determined as a failure of the condensed water level sensor in a next step (S105). Here, V_TH, V_cell, V_cell_TH, $\Delta$V_cell, $\Delta$V_cell_TH, RPM_cmd, RPM_TH, and P_TH signify condensed water difference acceptable reference value (m^3), stack cell voltage, stack cell voltage lowest limit reference value, stack cell voltage deviation, stack cell voltage deviation upper limit reference value, hydrogen recycle blower RPM command value, hydrogen recycle blower RPM difference acceptable reference value, and pressure difference acceptable reference value, respectively.

In a next step (S106), condensed water drain valve control (initial value: close) may be initiated based on the anode water trap (AWT) estimated value.

Upon drain valve control, if the residual amount of condensed water is greater than a product of the density ($\rho$[kg/m^3]) of condensed water and the volume (V2[m^3]) of the condensed water collector from the bottom thereof to the location of the water sensor, and the duration ($\Delta t$) is greater than a reference value (t3) in a next step (S107), a control for opening the condensed water drain valve may be performed in a next step (S108).

On the other hand, if the residual amount of condensed water is smaller than a product of the density ($\rho$[kg/m^3]) of condensed water and a value obtained by subtracting the condensed water difference acceptable reference value (V_TH) from the volume (V2[m^3]) of the condensed water collector from the bottom thereof to the location of the water sensor, or a drain valve open duration is greater than a reference value (t4) in a next step (S109), a control for closing the condensed water drain valve may be performed in a next step (S110).

Second Embodiment

Figure 7B:
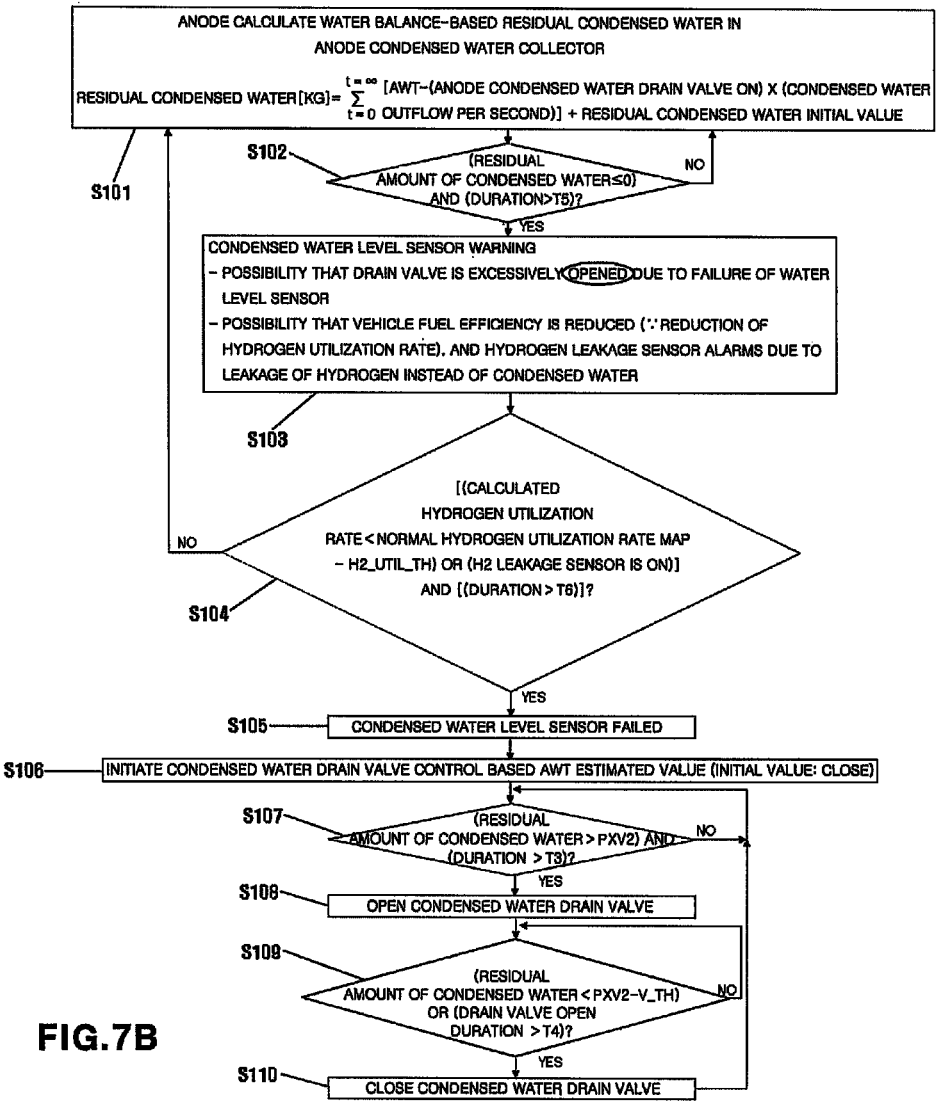

As shown in the flowchart of FIG. 7B, the residual amount of condensed water based on water balance in the anode condensed water collector may be calculated using Equation (1) in a first step (S201).

Next, if the residual amount of condensed water is equal to or smaller than about 0, and the duration is greater than a reference value (t5) in a further step (S202), it may be determined as a warning stage of a condensed water level sensor in a next step (S203).

That is, as the drain valve is excessively opened due to a failure of the water level sensor, it is determined that vehicle fuel efficiency may be reduced (reduction of hydrogen utilization rate), and a hydrogen leakage sensor may alarm due to leakage of hydrogen instead of condensed water.

Accordingly, if calculated hydrogen utilization rate is smaller than a value obtained by subtracting hydrogen utilization rate acceptable reference value (H2_Util_TH) from normal hydrogen utilization rate map, or the hydrogen leakage sensor is on, and the duration is greater than a reference value (t6) in a next step (S204), a failure of the condensed water level sensor may be determined in a next step (S205).

The normal hydrogen utilization rate map may utilize stack current-based hydrogen utilization rate test map, and the calculated hydrogen utilization rate may be calculated by Equation (2).

$$\text{Cuculated hydrogen utilization } [\%] = \qquad (2)$$
$$\left[ \sum_{t=0}^{t=T} [(\text{stack current} \times \text{stack number} \times 0.002) \div \right.$$
$$\left. (2 \times \text{Faraday constant})] \times \Delta t \right] \div$$
$$[\text{used hydrogen according to hydrogen tank pressure,}$$
$$\text{temperature (Van der Waals equation)}]$$

Accordingly, in a next step (S206), the condensed water drain valve control (initial value: close) may be initiated based on the anode water trap (AWT) estimated value.

Upon drain valve control, as described in the first embodiment, if the residual amount of condensed water is greater than the product of the density ($\rho$[kg/m^3]) of condensed water and the volume (V2[m^3]) of the condensed water collector from the bottom thereof to the location of the water sensor, and the duration ($\Delta t$) is greater than the reference value (t3) in a next step (S207), a control for opening the condensed water drain valve may be performed in a next step (S208).

On the other hand, if the residual amount of condensed water is smaller than the product of the density ($\rho$[kg/m^3]) of condensed water and the value obtained by subtracting the condensed water difference acceptable reference value (V_TH) from the volume (V2[m^3]) of the condensed water collector from the bottom thereof to the location of the water sensor, or the drain valve open duration is greater than the reference value (t4) in a next step (S209), a control for closing the condensed water drain valve may be performed in a next step (S210).

The methods for controlling anode condensed water drain using a relative humidity and condensed water estimator according to third and fourth embodiments of the present invention may perform drain valve on/of control based on the cumulative amount of generated water in the anode condensed water collector, e.g., a ratio difference of the cumulative amount of condensed water to the cumulative amount of generated water unlike those of the first and second embodiments.

The methods for controlling anode condensed water drain according to the third and fourth embodiments of the present invention illustratively includes determining whether the water level sensor in the condensed water collector is normal, based on a ratio difference obtained by calculating a drain valve operation-based cumulative condensed water ratio (AWT_ratio1) based on the cumulative amount of generated water and an estimator-based cumulative condensed water ratio (AWT_ratio2), and if abnormal, performing drain valve on/off control based a residual condensed water estimated value.

In this case, when the drain valve operation-based cumulative condensed water ratio (AWT_ratio1) is smaller than the estimator-based cumulative condensed water ratio (AWT_ratio2) by an acceptable reference value, the drain valve may be excessively closed due to a failure of the water level sensor. Thus, if cell voltage drop, abnormal operation of the hydrogen recycle blower, and abnormality of anode-side stack inlet/outlet pressure occur due to serious flooding in the stack, it is determined that the water level sensor fails. Then, condensed water drain valve on/off control based on the anode water trap (AWT) estimate may be performed to maintain residual condensed water near the water level sensor.

Also, when the drain valve operation-based cumulative condensed water ratio (AWT_ratio1) is greater than the estimator-based cumulative condensed water ratio (AWT_ratio2) by the acceptable reference value, the drain valve may be excessively opened due to a failure of the water level sensor. Thus, if the hydrogen utilization rate is reduced, and hydrogen leakage sensor alarms due to leakage of hydrogen instead of condensed water, it may be determined that the water level sensor fails. Then, condensed water drain valve on/off control based on the anode water trap (AWT) estimate may be performed to maintain residual condensed water near the water level sensor.

Hereinafter, the method for controlling anode condensed water drain using the relative humidity and condensed water estimator according to the third and fourth embodiments will be described in further detail.

Third Embodiment

Figure 8A:
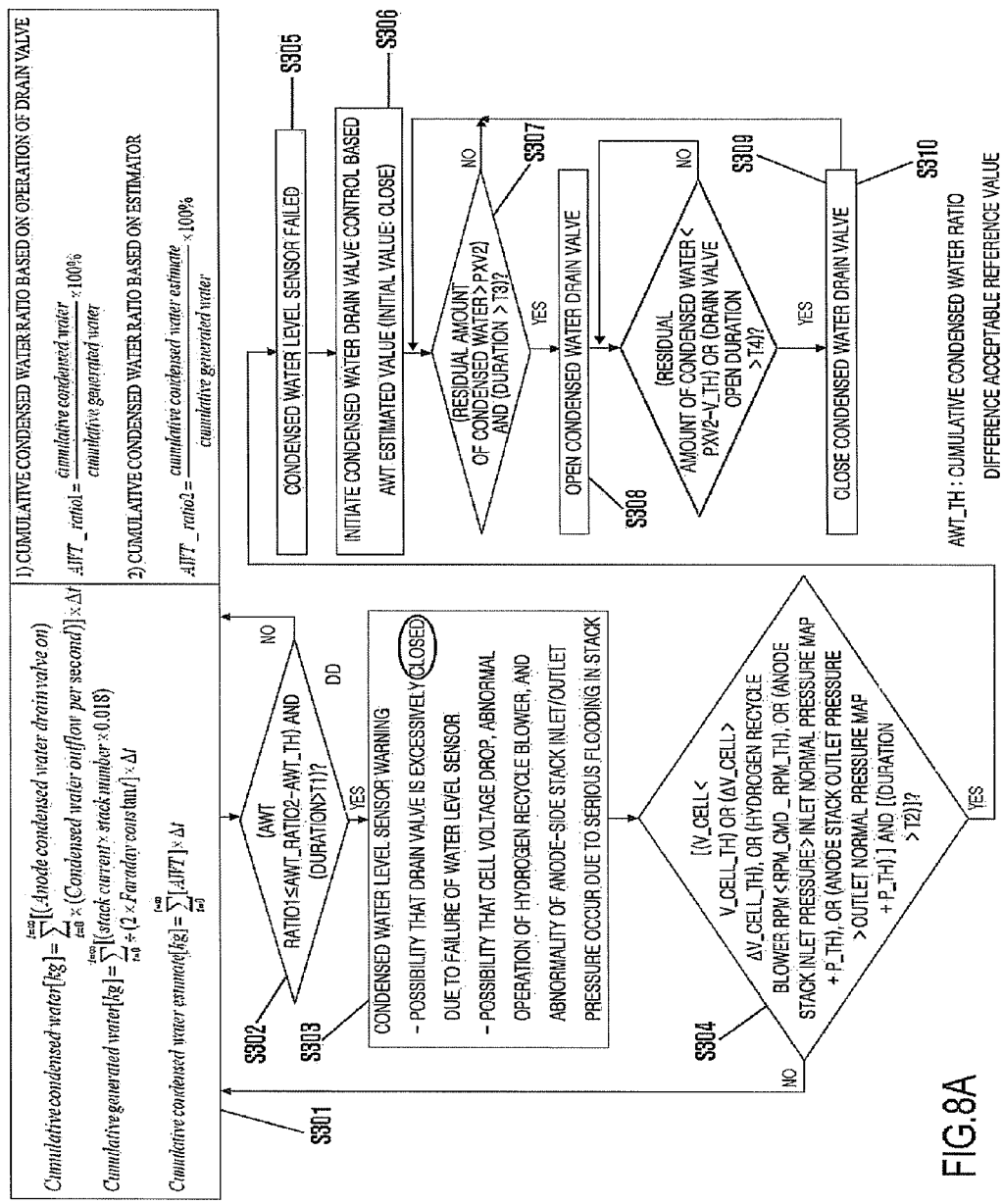
FIGS. 8A and 8B are flowcharts illustrating methods for controlling condensed water drain using a relative humidity and condenser water estimator for a fuel cell according third and fourth exemplary embodiments of the present invention.

As shown in the flowchart of FIG. 8A, the cumulative amount of condensed water, the cumulative amount of generated water, and the cumulative condensed water estimated value, based on the operation of the drain valve in the anode condensed water collector, may be calculated using Equations (3), (4), and (5) in a first step (S301).

$$\text{Cumulative condensed water[kg]} = \qquad (3)$$
$$\sum_{t=0}^{t=\infty} [(\text{Anode condensed water drain valve on}) \times$$
$$(\text{Condensed water outflow per second})] \times \Delta t$$

$$\text{Cumulative generated water[kg]} = \sum_{t=0}^{t=\infty} [ \qquad (4)$$
$$(\text{stack current} \times \text{stack number} \times 0.018) \div (2 \times \text{Faraday constant}] \times \Delta t$$

$$\text{Cumulative condensed water estimate[kg]} = \sum_{t=0}^{t=\infty} [AWT] \times \Delta t \qquad (5)$$

In this case, the drain valve operation-based cumulative condensed water ratio (AWT_ratio1) and the estimator-based cumulative condensed water ratio (AWT_ratio2) may be calculated by Equations (6) and (7) below.

$$\text{AWT\_ratio1} = \frac{\text{cumulative condensed water}}{\text{cumulative generated water}} \times 100\% \qquad (6)$$

$$\text{AWT\_ratio2} = \frac{\text{cumulative condensed water estimate}}{\text{cumulative generated water}} \times 100\% \qquad (7)$$

If the cumulative condensed water ratio (AWT_ratio1) is smaller than a value obtained by subtracting the cumulative condensed water ratio difference acceptable reference value (AWT_TH) from the cumulative condensed water ratio (AWT_ratio2), and the duration is greater than the reference value t1 in a further step (S302), it may be determined as a warning stage of a condensed water level sensor in a next step (S303).

As the drain valve is excessively closed due to a failure of the water level sensor, cell voltage drop, abnormal operation of hydrogen recycle blower, and anode stack inlet/outlet pressure abnormality may occur due to serious flooding in the stack.

Accordingly, if V_cell is smaller than V_cell_TH, ΔV_cell is greater than ΔV_cell_TH, hydrogen recycle blower RPM is smaller than RPM_cmd_RPM_TH, anode stack inlet pressure is greater than inlet normal pressure map plus P_TH, or anode stack outlet pressure is greater than outlet normal pressure map plus P_TH, and the duration is greater than a reference value (t2) in a next step (S304), it may be determined as a failure of the condensed water level sensor in a next step (S305)

Here, V_TH, V_cell, V_cell_TH, ΔV_cell, ΔV_cell_TH, RPM_cmd, RPM_TH, and P_TH signify condensed water difference acceptable reference value (m^3), stack cell voltage, stack cell voltage lowest limit reference value, stack cell voltage deviation, stack cell voltage deviation upper limit reference value, hydrogen recycle blower RPM command value, hydrogen recycle blower RPM difference acceptable reference value, and pressure difference acceptable reference value, respectively.

In a next step (S306), condensed water drain valve control (initial value: close) may be initiated based on the anode water trap (AWT) estimated value.

Upon control of the drain valve, if the residual amount of condensed water is greater than the product of the density (ρ[kg/m^3]) of condensed water and the volume (V2[m^3]) of the condensed water collector from the bottom thereof to the location of the water sensor, and the duration (Δt) is greater than the reference value (t3) in a next step (S307), a control for opening the condensed water drain valve may be performed in a next step (S308).

On the other hand, if the residual amount of condensed water is smaller than the product of the density (ρ[kg/m^3]) of condensed water and the value obtained by subtracting the condensed water difference acceptable reference value (V_TH) from the volume (V2[m^3]) of the condensed water collector from the bottom thereof to the location of the water sensor, or the drain valve open duration is greater than the reference value t4 in a next step (S309), a control for closing the condensed water drain valve may be performed in a next step (S310).

Fourth Embodiment

Figure 8B:
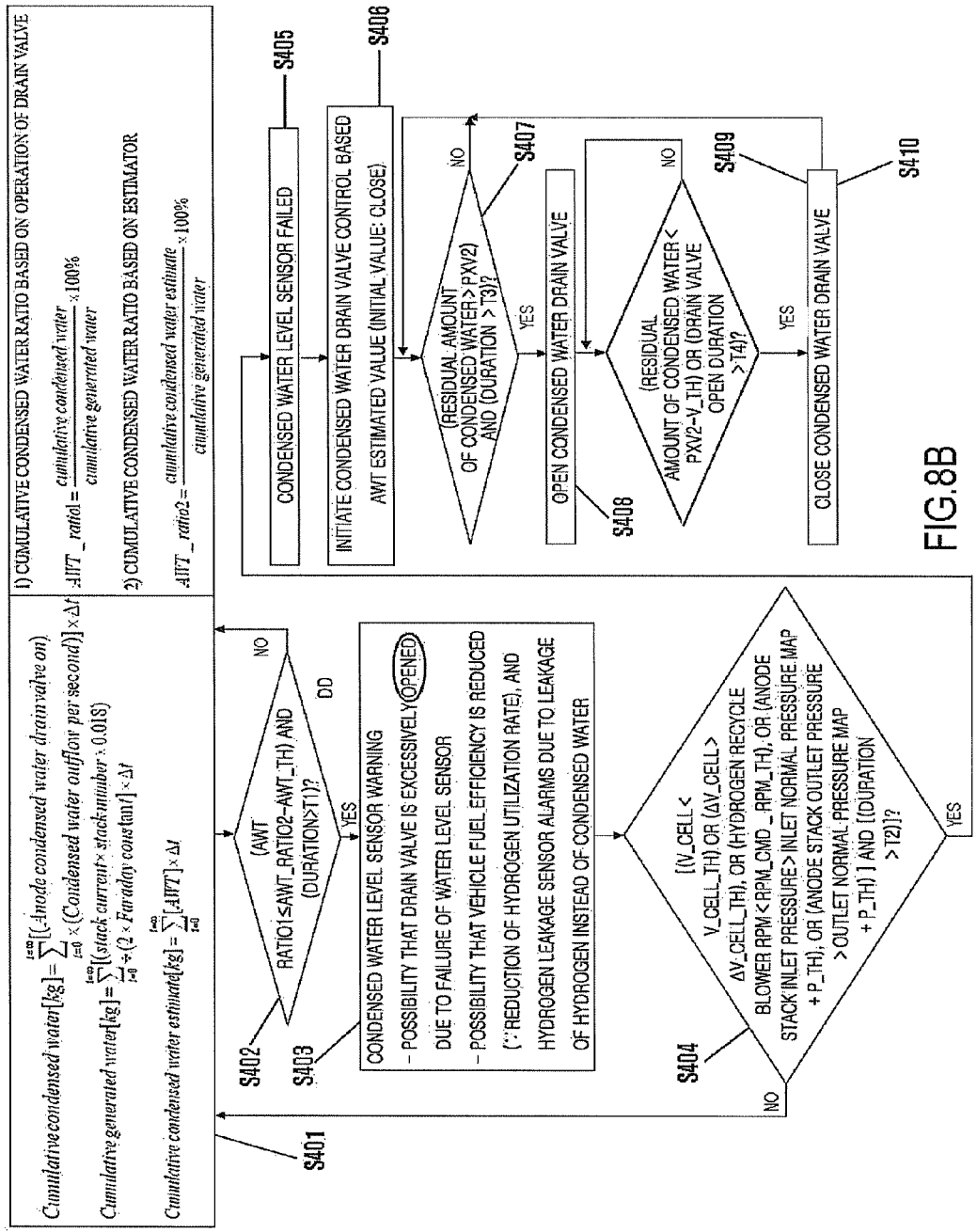

As shown in the flowchart of FIG. 8B, the cumulative amount of condensed water, the cumulative amount of generated water, and the cumulative condensed water estimated value, based on the operation of the drain valve in the anode condensed water collector, may be calculated using Equations (2), (3), and (4) of the third embodiment in a first step (S401).

Next, if the cumulative condensed water ratio (AWT_ratio1) is greater than a value obtained by adding the cumulative condensed water ratio difference acceptable reference value (AWT_TH) to the cumulative condensed water ratio (AWT_ratio2), and the duration is greater than the reference value (t5) in a further step (S402), it may be determined as a warning stage of a condensed water level sensor in a next step (S403).

That is, as the drain valve is excessively opened due to a failure of the water level sensor, it is determined that vehicle fuel efficiency may be reduced (reduction of hydrogen utilization rate), and a hydrogen leakage sensor may alarm due to leakage of hydrogen instead of condensed water.

Accordingly, if the calculated hydrogen utilization rate is smaller than a value obtained by subtracting hydrogen utilization rate acceptable reference value (H2_Util_TH) from normal hydrogen utilization rate map, or the hydrogen leakage sensor is on, and the duration is greater than a reference value t6 in a next step (S404), a failure of the condensed water level sensor may be determined in a next step (S405).

As described in the second embodiment, the normal hydrogen utilization rate map may utilize a stack current-based hydrogen utilization rate test map, and the calculated hydrogen utilization rate may be calculated by Equation (2).

In a next step (S406), condensed water drain valve control (initial value: close) may be initiated based on the anode water trap (AWT) estimated value.

Upon drain valve control, if the residual amount of condensed water is greater than a product of the density (ρ[kg/m^3]) of condensed water and the volume (V2[m^3]) of the condensed water collector from the bottom thereof to the location of the water sensor, and the duration (Δt) is greater than a reference value (t3) in a next step (S407), a control for opening the condensed water drain valve may be performed in a next step (S408).

On the other hand, if the residual amount of condensed water is smaller than a product of the density (ρ[kg/m^3]) of condensed water and a value obtained by subtracting the condensed water difference acceptable reference value (V_TH) from the volume (V2[m^3]) of the condensed water collector from the bottom thereof to the location of the water sensor, or a drain valve open duration is greater than a reference value t4 in a next step (S409), a control for closing the condensed water drain valve may be performed in a next step (S410).

Advantageously, an estimator according to an embodiment of the present invention can estimate relative humidity and condensed water in a fuel cell system based on typical sensor signals without a separate sensor. Furthermore, the estimator can improve the reliability of controlling a condensed water drain valve in terms of fail-safety, based on the failure determination of a typical anode condensed water level sensor. In addition, when the water level sensor of the condensed water drain valve fails, flooding can be prevented in a stack, and a hydrogen recycle blower unit can be prevented from breaking down. Also, the fuel efficiency and safety can be improved by preventing an excessive hydrogen leakage.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A relative humidity and condensed water estimator for a fuel cell, comprising:

a plurality of controllers programmed to dynamically estimate relative humidity and condensed water in a fuel cell system, wherein the relative humidity and condensed water estimator is utilized in control of the fuel cell system involving control of an anode condensed water drain by inputting flow rate of air supplied to a cathode of the fuel cell, cooling water temperature at an inlet or an outlet of the fuel cell, air pressure sensor data or air flow-based map data at the inlet or the outlet of the fuel cell, and hydrogen pressure sensor data at the inlet or the outlet of the fuel cell; and by outputting air-side relative humidity, hydrogen-side relative humidity, membrane water contents, oxygen supercharging ratio, hydrogen supercharging ratio, or residual water in the fuel cell, wherein outputs of the relative humidity and condensed water estimator are dynamically calculated at intervals of 2 milliseconds to 500 milliseconds for controlling the fuel cell without a relative humidity sensor monitoring the relative humidity inside the fuel cell.

2. The relative humidity and condensed water estimator of claim 1, wherein an air blower controller receives ambient temperature, atmospheric pressure, and atmospheric relative humidity to calculate cathode relative humidity at the inlet of the humidifier on an assumption that a vapor flow supplied through an air blower is conserved.

\* \* \* \* \*